(12) United States Patent
Byun et al.

(10) Patent No.: US 12,479,288 B2
(45) Date of Patent: Nov. 25, 2025

(54) ACTIVE AIR FLAP FOR VEHICLES

(71) Applicant: HYUNDAI MOBIS Co., Ltd., Seoul (KR)

(72) Inventors: Jae Sup Byun, Gwangmyeong-si (KR); Kyeong Am Lee, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 509 days.

(21) Appl. No.: 17/942,374

(22) Filed: Sep. 12, 2022

(65) Prior Publication Data
US 2023/0080238 A1  Mar. 16, 2023

(30) Foreign Application Priority Data
Sep. 14, 2021  (KR) .................. 10-2021-0122605

(51) Int. Cl.
*B60K 11/08* (2006.01)
*B60K 11/04* (2006.01)

(52) U.S. Cl.
CPC ............ *B60K 11/085* (2013.01); *B60K 11/04* (2013.01)

(58) Field of Classification Search
CPC .............................. B60K 11/085; B60K 11/04
USPC ......................................................... 180/68.1
See application file for complete search history.

(56) References Cited

U.S. PATENT DOCUMENTS

| | | | |
|---|---|---|---|
| 9,233,605 B2 * | 1/2016 | Hijikata | B60K 11/085 |
| 9,533,565 B2 * | 1/2017 | Elliott | B60K 11/085 |
| 10,150,362 B2 * | 12/2018 | Wiech | F01P 7/10 |
| 2010/0243352 A1 * | 9/2010 | Watanabe | B60K 11/085 |
| | | | 180/68.1 |
| 2011/0073395 A1 * | 3/2011 | Lee | F01P 7/12 |
| | | | 180/68.1 |
| 2012/0012410 A1 * | 1/2012 | Hori | B60K 11/085 |
| | | | 180/68.1 |
| 2013/0146375 A1 * | 6/2013 | Lee | B60K 11/085 |
| | | | 180/68.1 |

(Continued)

FOREIGN PATENT DOCUMENTS

| | | |
|---|---|---|
| JP | 2014-024474 A | 2/2014 |
| KR | 101575255 B1 | 12/2015 |

(Continued)

OTHER PUBLICATIONS

Office Action issued in corresponding Korean Patent Application No. 10-2021-0122605 dated Apr. 11, 2025, with English translation.

*Primary Examiner* — Hau V Phan
(74) *Attorney, Agent, or Firm* — MORGAN, LEWIS & BOCKIUS LLP

(57) ABSTRACT

Disclosed herein is an active air flap for vehicles, which includes a flap part configured to open and close an outside air inlet of a grill located at a front of a vehicle through a plurality of paths, a drive unit configured to provide a driving force to the flap part, and a link unit configured to transmit the driving force of the drive unit to the flap part, wherein the link unit includes a loader shaft configured to rotate in conjunction with an actuator shaft of the drive unit, a link bar having one end connected to both ends of the loader shaft in a longitudinal direction, and the other end located at both ends of the flap part, and a link panel configured to connect the other end of the link bar and both ends of the flap part.

8 Claims, 30 Drawing Sheets

(56) References Cited

U.S. PATENT DOCUMENTS

| | | | | |
|---|---|---|---|---|
| 2015/0159541 A1* | 6/2015 | Solazzo | ............... | B60K 11/04 |
| | | | | 73/114.68 |
| 2020/0215900 A1* | 7/2020 | Kim | ............... | B60K 11/06 |
| 2020/0361305 A1* | 11/2020 | Schneider | ............ | B60K 11/085 |

FOREIGN PATENT DOCUMENTS

| | | | |
|---|---|---|---|
| KR | 10-2021-0033181 A | 3/2021 | |
| KR | 10-2021-0047506 A | 4/2021 | |
| KR | 10-2021-0088241 A | 7/2021 | |

* cited by examiner

B-B'

FIG. 21
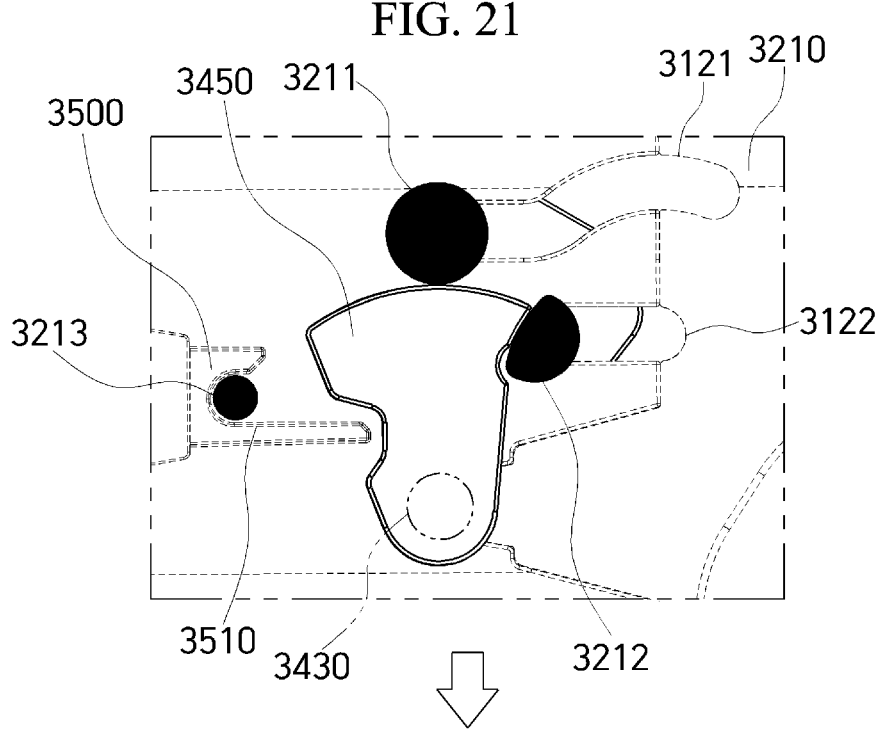
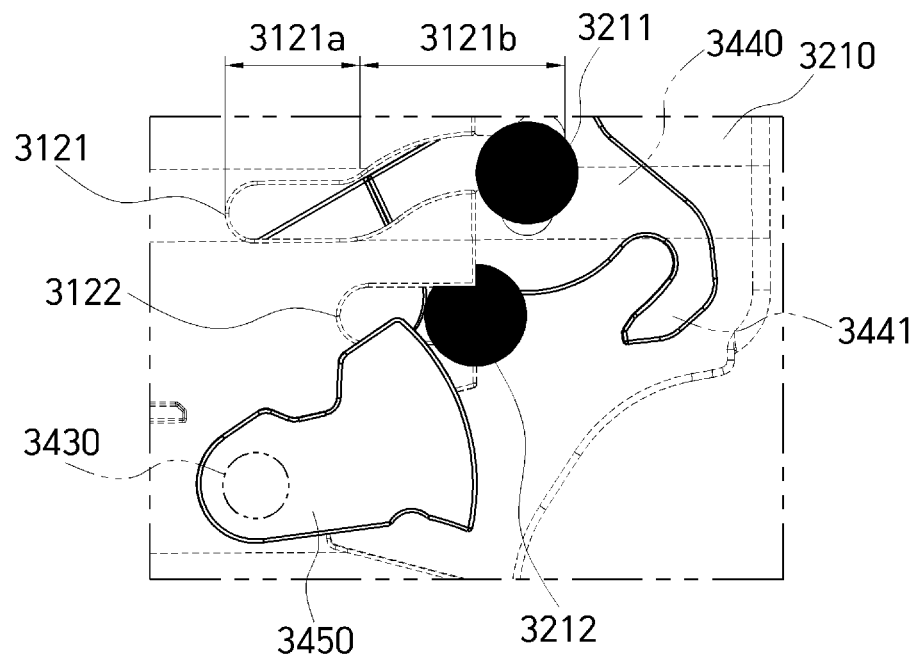

ACTIVE AIR FLAP FOR VEHICLES

CROSS-REFERENCE TO RELATED APPLICATION

This application claims priority to Korean Patent Application No. 10-2021-0122605, filed on Sep. 14, 2021, the disclosure of which is incorporated herein by reference in its entirety.

BACKGROUND

1. Technical Field

The present disclosure relates to an active air flap for vehicles.

2. Related Art

An active air flap (AAF) is installed inside (or to) a bumper or a grill in the front of a vehicle to open and close an outside air inlet of the grill depending on the condition (e.g., driving condition, etc.) of the vehicle.

Specifically, the active air flap closes flap members so that the outside air inlet is closed to achieve the effect of reducing air resistance and improving fuel efficiency while the vehicle is traveling at high speed, or opens the flap members so that the outside air inlet is opened to lower a temperature in an overheated engine room.

Conventionally, in the active air flap, a driving pressure is increased when an actuator is actuated to simultaneously rotate the multiple flap members configured to open and close the outside air inlet, which may lead to an increase in torque of the actuator that rotates the flap members.

SUMMARY

Various embodiments are directed to an active air flap for vehicles, which is capable of increasing cooling efficiency and optimizing aerodynamic performance by controlling flap members to be sequentially operated based on the structure of multi-path (2-way path) operation.

In particular, various embodiments are directed to an active air flap for vehicles, which is capable of preventing one or multiple flap members from being pushed due to aerodynamics and simultaneously twisted in either direction when the flap members are operated.

The present disclosure is not limited to the above-mentioned objects, and other objects of the present disclosure can be clearly understood by those skilled in the art to which the present disclosure pertains from the following description.

In accordance with an aspect of the present disclosure, there is provided an active air flap for vehicles, which includes a flap part configured to open and close an outside air inlet of a grill located at a front of a vehicle through a plurality of paths, a drive unit configured to provide a driving force to the flap part, and a link unit configured to transmit the driving force of the drive unit to the flap part.

The link unit may include a loader shaft configured to rotate in conjunction with an actuator shaft of the drive unit, a link bar having one end connected to both ends of the loader shaft in a longitudinal direction, and the other end located at both ends of the flap part, and a link panel configured to connect the other end of the link bar and both ends of the flap part.

The one end of the link bar and the link panel may be connected to be rotatable with respect to each other.

The other end of the link bar may be fixed and connected to the loader shaft to rotate in conjunction with the loader shaft.

The flap part may be connected to enable a linear movement and a rotation movement on a frame that communicates with the outside air inlet of the grill located at the front of the vehicle to open and close the outside air inlet.

The flap part may include a flap unit configured to communicate with the outside air inlet of the grill located at the front of the vehicle, and connected to a frame including a first guide groove in which a straight section and a curved section are configured as a single path, and a second guide groove having a straight path in a state of being spaced apart from the first guide groove to open and close the outside air inlet, a first guide protrusion protruding in a partial section of both ends of the flap unit and movable on the first guide groove, and a second guide protrusion having a stepped portion spaced apart from the first guide protrusion, and movable on the second guide groove.

The flap unit may linearly move to the straight section of the first guide groove and the straight path of the second guide groove and then rotate through the curved section of the first guide groove when the outside air inlet is opened, and may rotate by the curved section of the first guide groove and then return to an initial position through the straight section of the first guide groove and the straight path of the second guide grooves when the outside air inlet is closed.

The second guide protrusion may be located at a rear end of the second guide groove to function as a rotation shaft of the flap unit when the flap unit opens and closes the outside air inlet.

The drive unit and the link unit may be built in a frame that communicates with the outside air inlet of the grill, and a portion partially protruding from the frame may be covered by a cover.

In accordance with another aspect of the present disclosure, there is provided an active air flap for vehicles, which includes a flap part having a flap unit configured to communicate with an outside air inlet of a grill located at a front of a vehicle, slide in a forward-rearward direction, and rotate at a certain point to open and close the outside air inlet, a drive unit configured to provide a driving force to the flap part, a link unit configured to transmit the driving force of the drive unit to the flap part, and a fixing unit disposed on a sliding path of the flap unit to prevent the flap unit from being pushed rearward or twisted due to aerodynamics when a fixing protrusion protruding from both ends of the flap unit is seated.

The fixing unit may have a fixing groove corresponding to the fixing protrusion formed therein.

The link unit may include a loader shaft configured to rotate in conjunction with an actuator shaft of the drive unit, a link bar having one end connected to both ends of the loader shaft in a longitudinal direction, and the other end located at both ends of the flap part, and a link panel configured to connect the other end of the link bar and both ends of the flap part.

In accordance with still another aspect of the present disclosure, there is provided an active air flap for vehicles, which includes a flap part having a flap unit configured to open and close an outside air inlet of a grill located at a front of a vehicle according to a preset logic path, a drive unit configured to provide a driving force to the flap part, and a link unit configured to transmit the driving force of the drive unit to the flap part.

The link unit may include a loader shaft configured to connect both ends of the flap unit in a longitudinal direction to prevent the flap unit from being twisted, and a fixing unit disposed on the loader shaft to be located in a specific section in which the flap unit is rotated to prevent the flap unit from being pushed or twisted due to aerodynamics.

The link unit may further include a link bar having one end connected to both ends of the loader shaft in a longitudinal direction, and the other end located at both ends of the flap part, and a link panel configured to connect the other end of the link bar and both ends of the flap part.

BRIEF DESCRIPTION OF THE DRAWINGS

FIG. 21 is a side cross-sectional view illustrating an operation of a stopper in the process of opening and closing the active air flap according to the third embodiment of the present disclosure.

DETAILED DESCRIPTION

Figure 1:
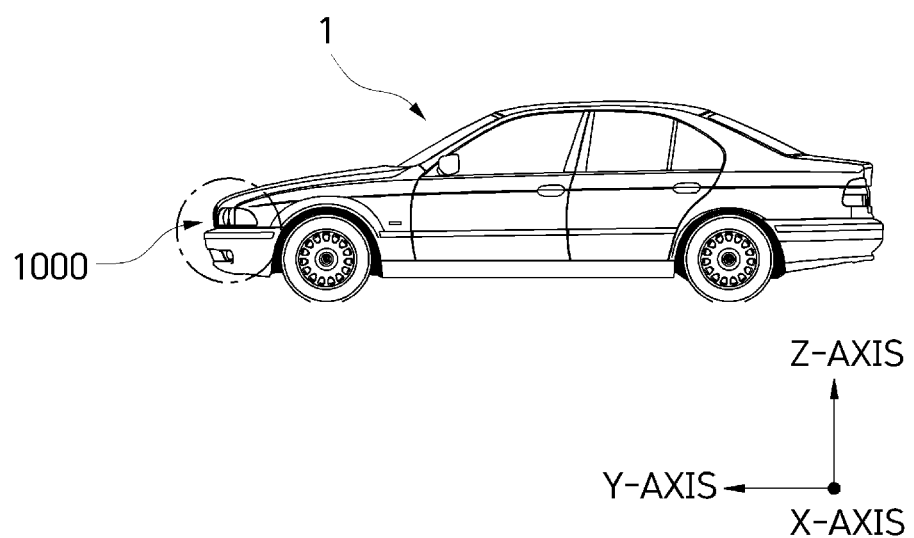
FIG. 1 is an exemplary view schematically illustrating an installation position of an active air flap according to a first embodiment of the present disclosure.
Figure 2:
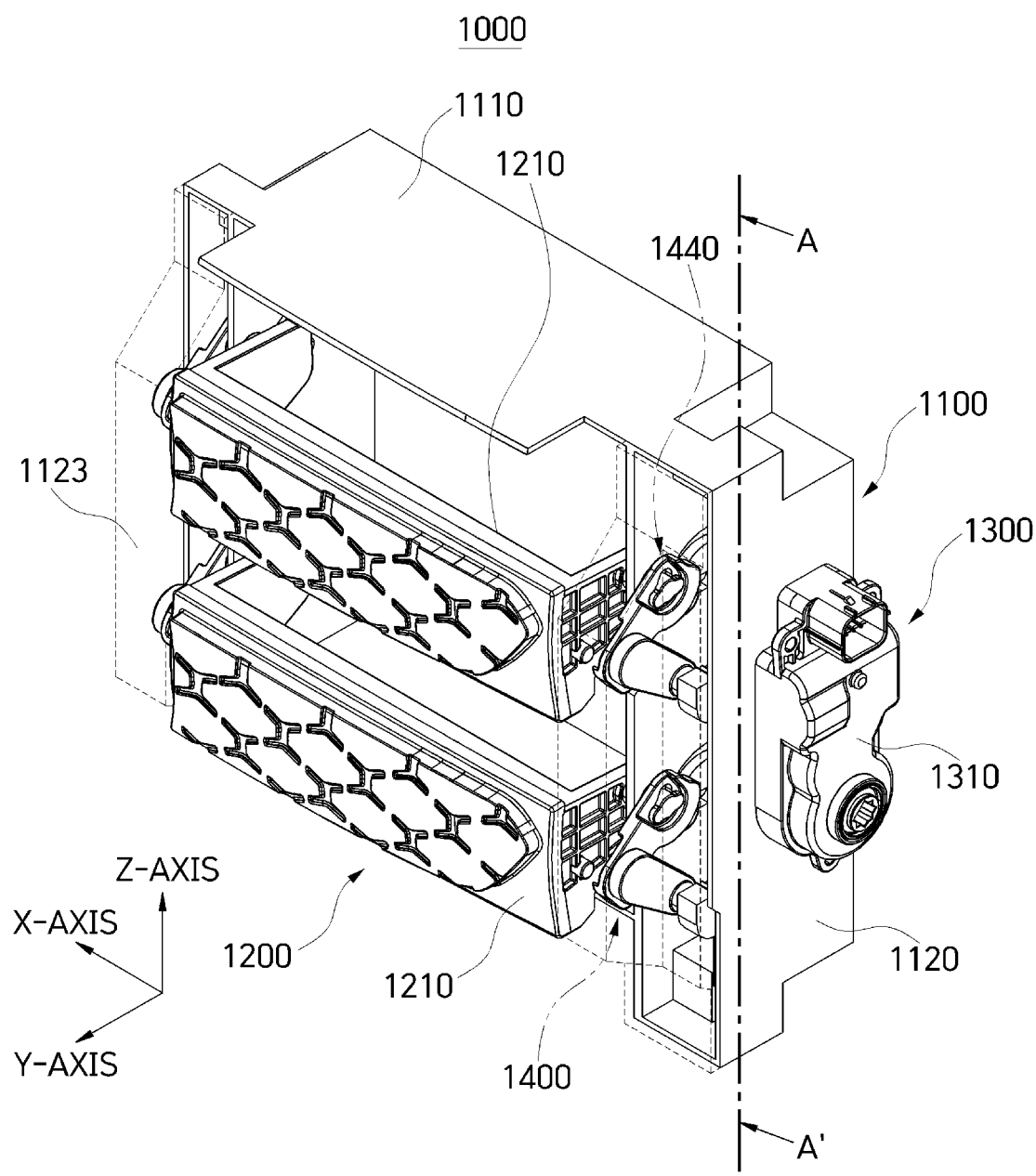
FIG. 2 is a perspective view schematically illustrating the active air flap according to the first embodiment of the present disclosure.
Figure 3:
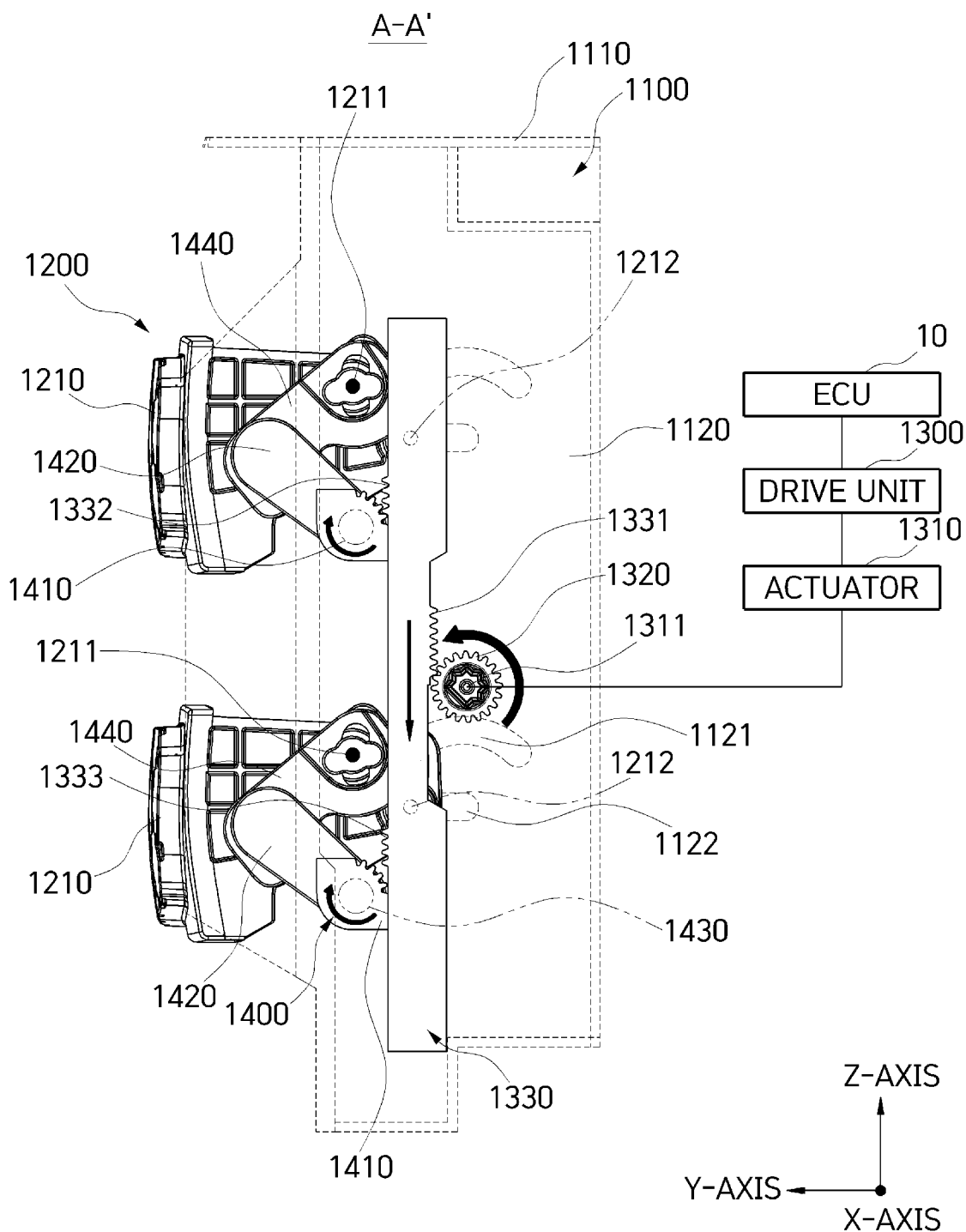
FIGS. 3 and 4 are cross-sectional views taken along A-A of FIG. 2.
Figure 4:
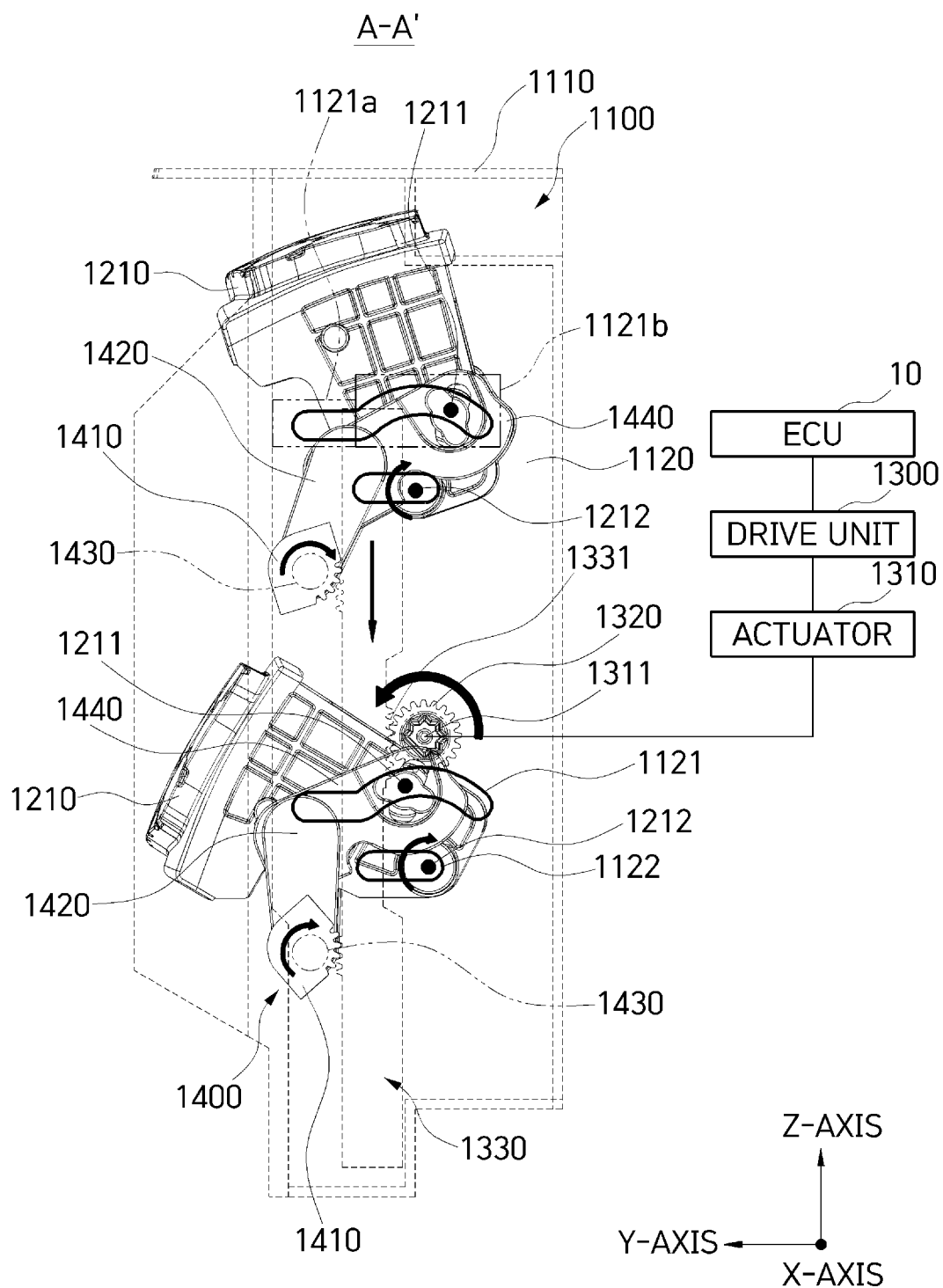
Figure 5:
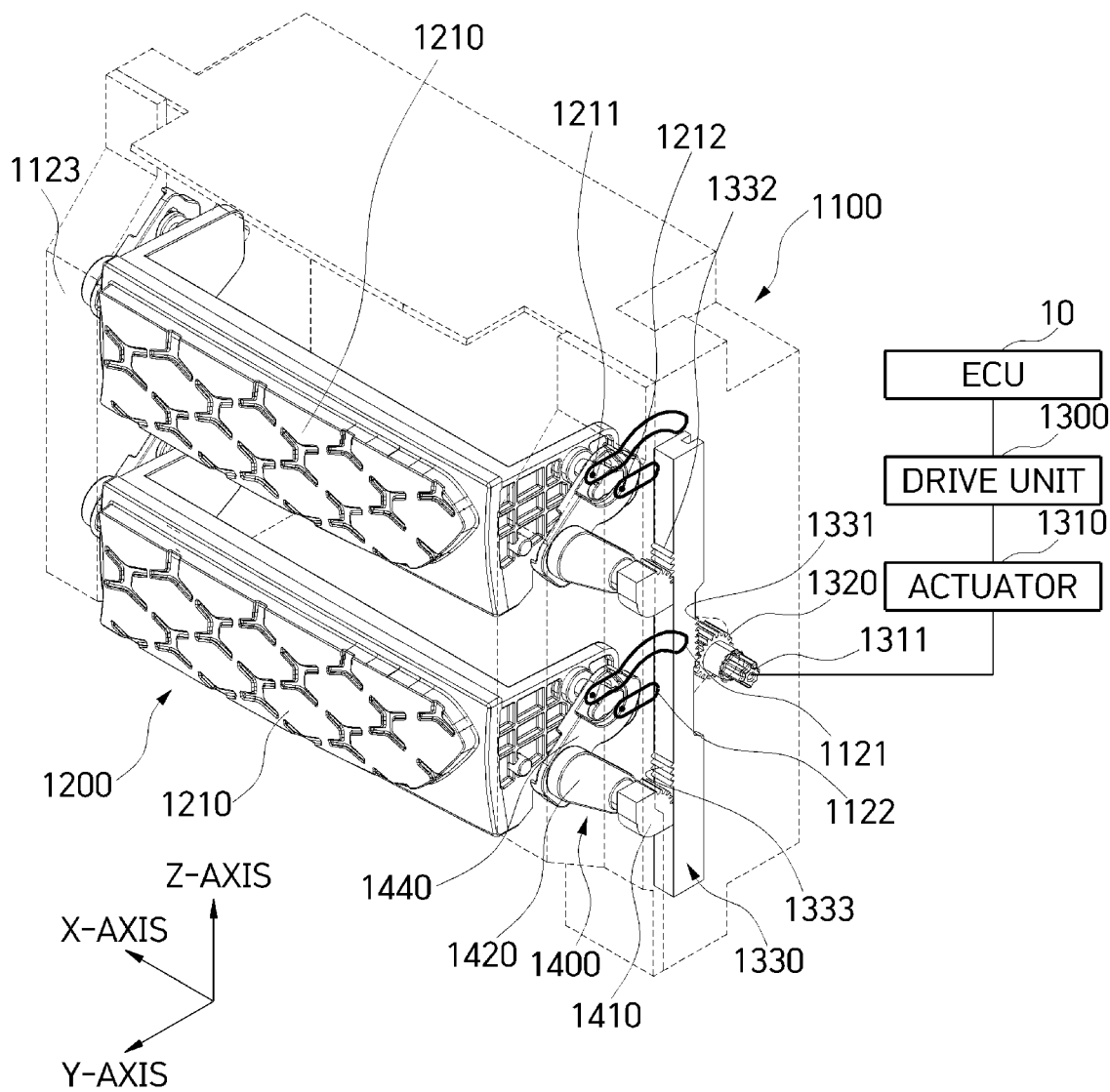
FIGS. 5 to 9 are exemplary views illustrating a state in which the active air flap is sequentially opened according to the first embodiment of the present disclosure.
Figure 6:
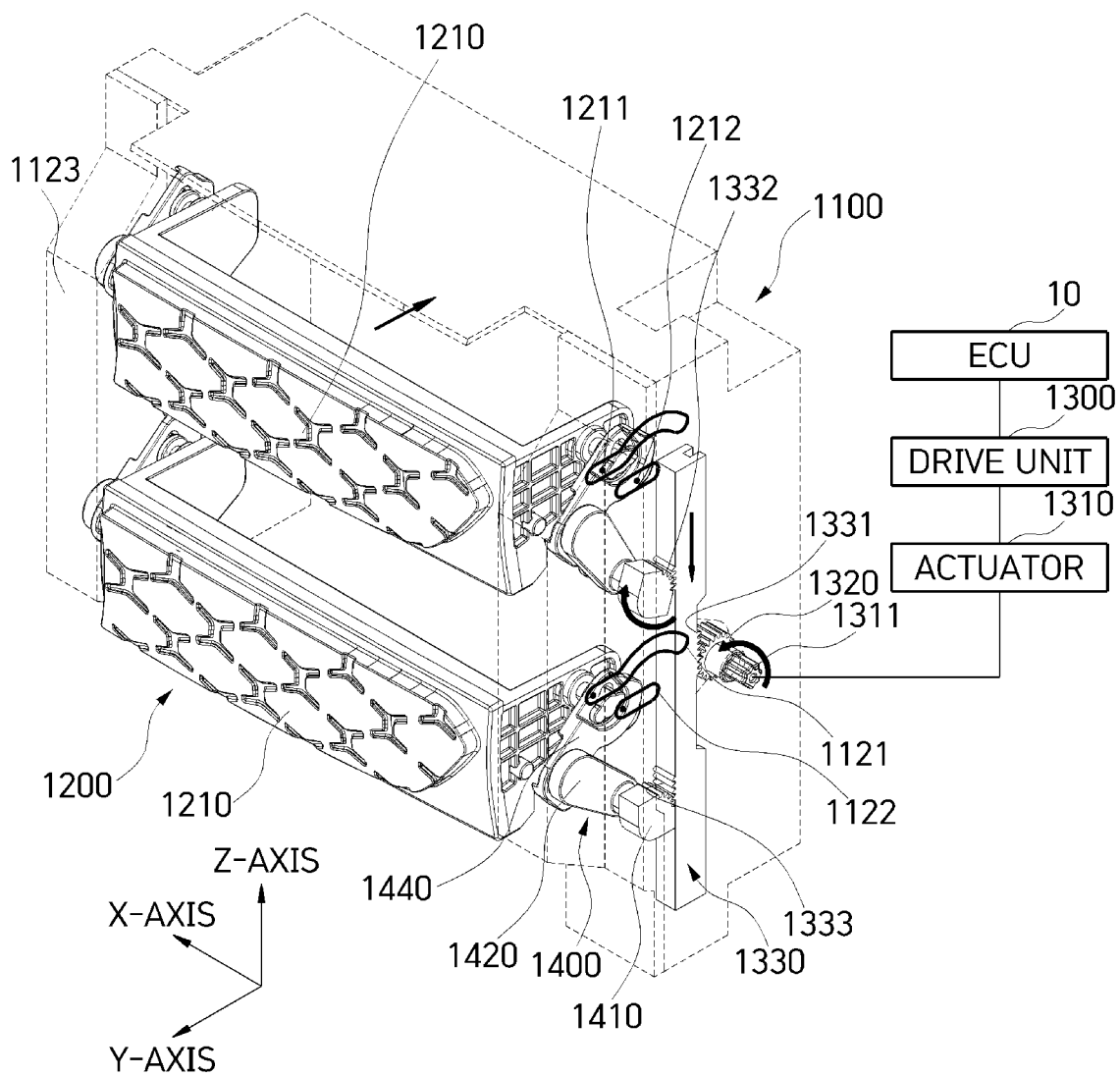
Figure 7:
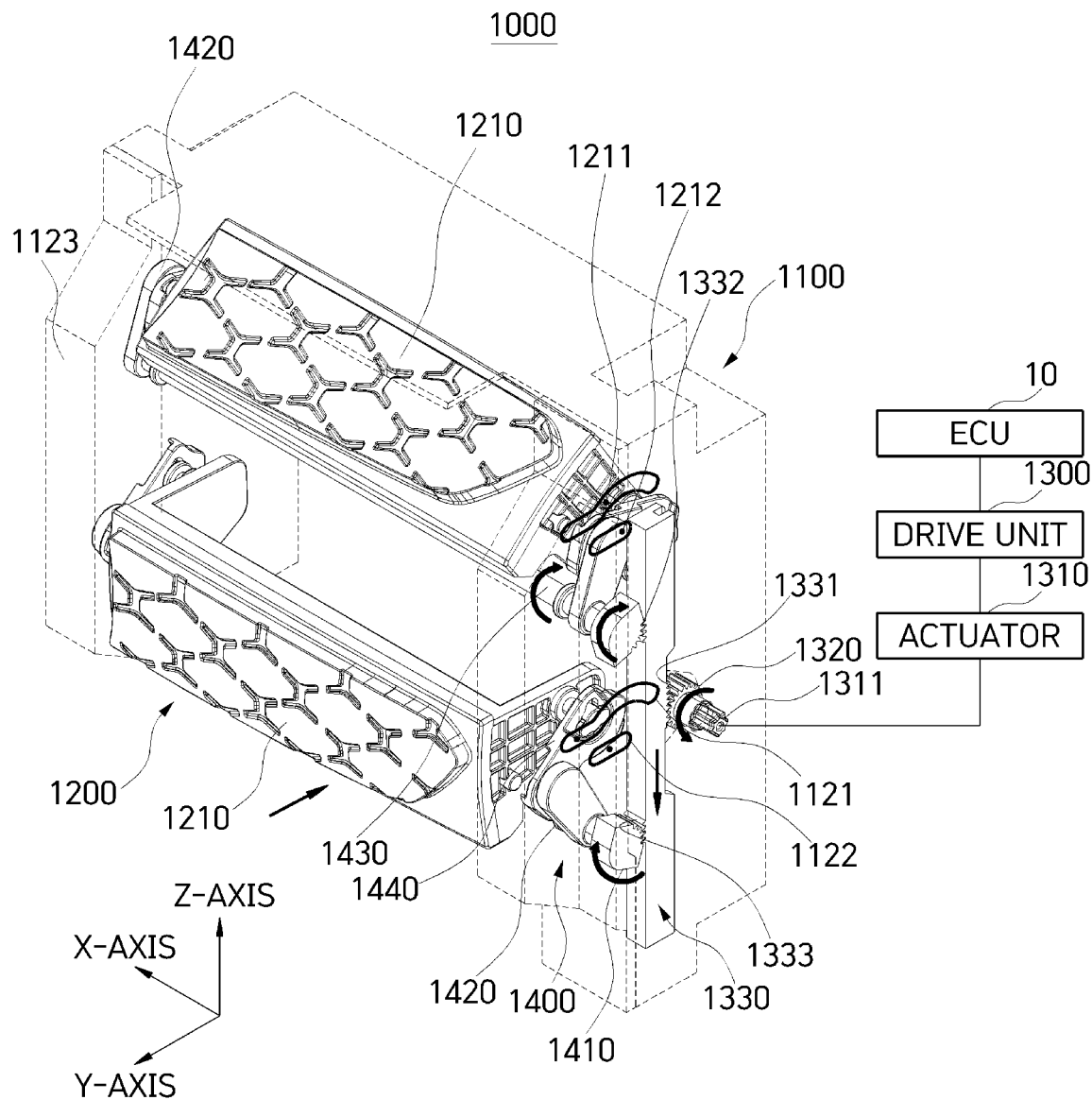
Figure 8:
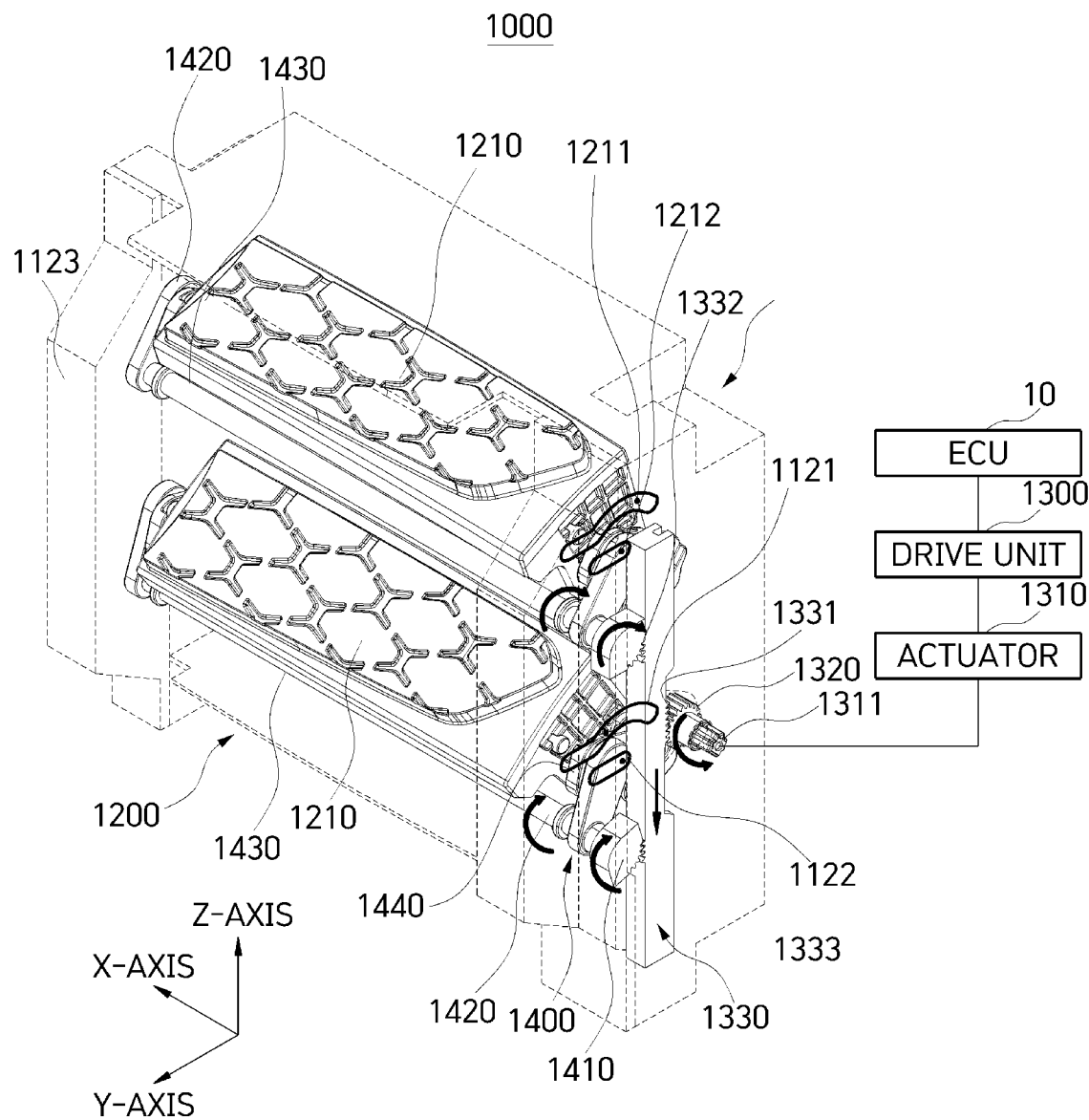
Figure 9:
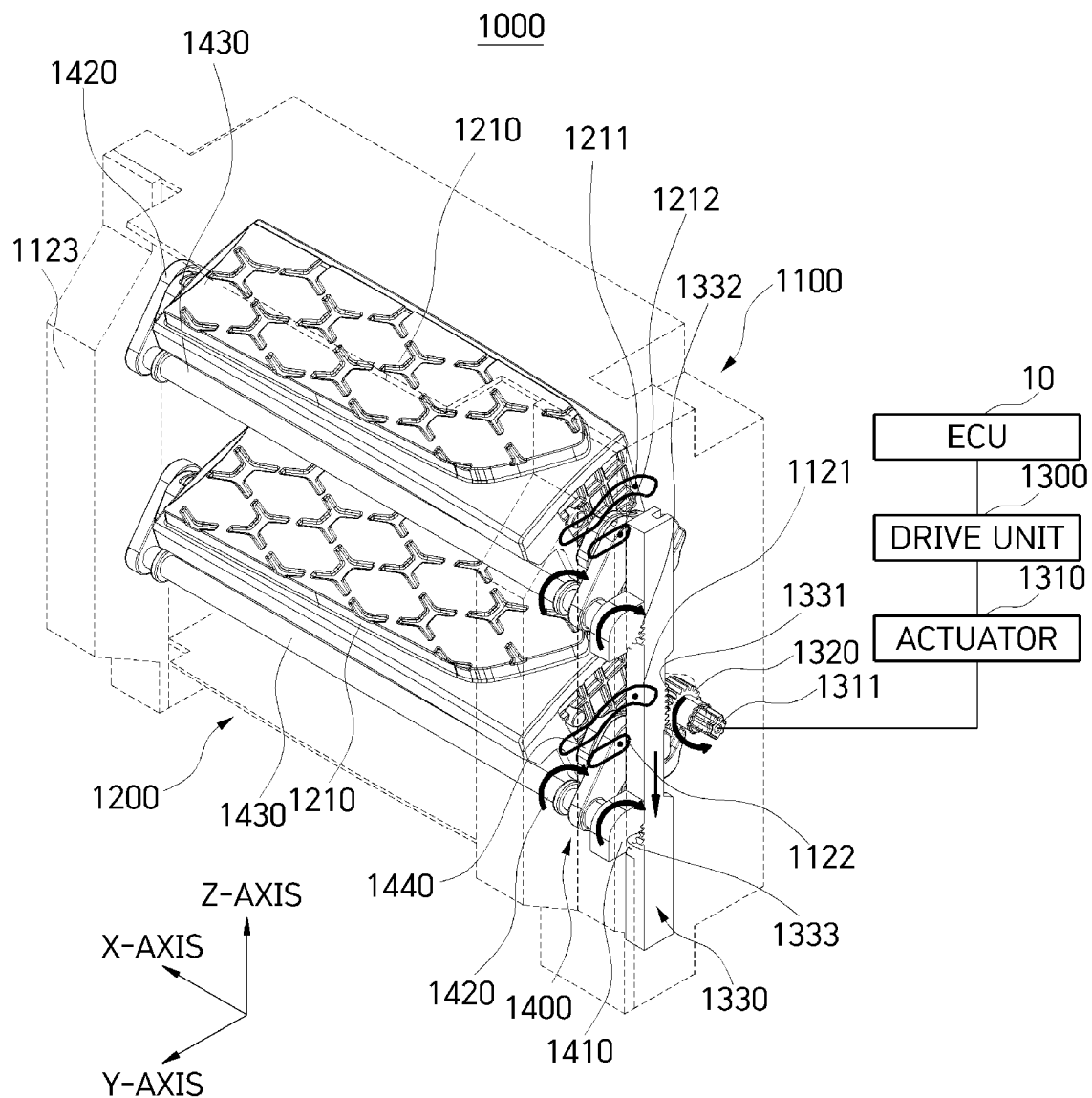
Figure 10:
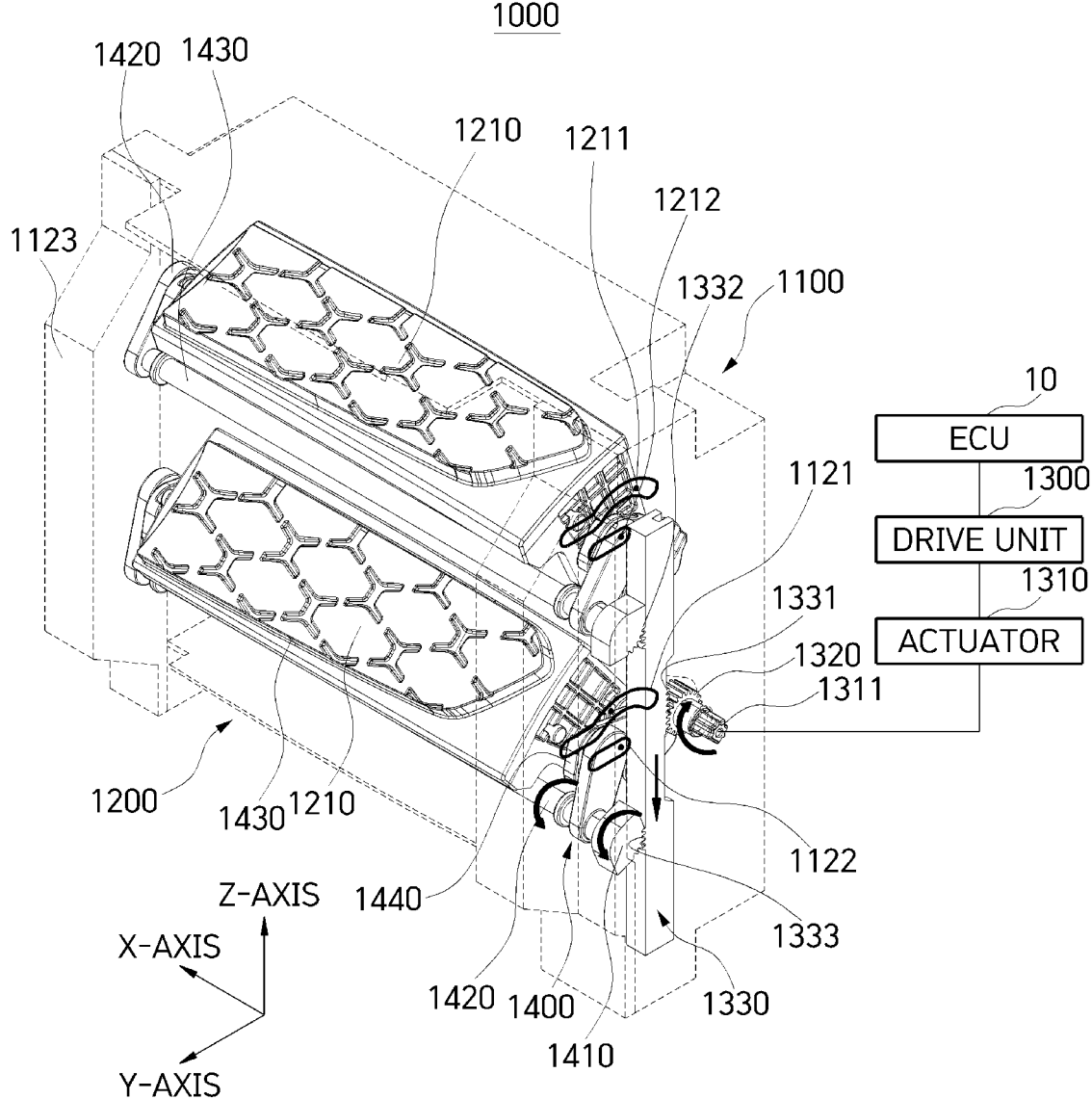
FIGS. 10 to 13 are exemplary views illustrating a state in which the active air flap is sequentially closed according to the first embodiment of the present disclosure.
Figure 11:
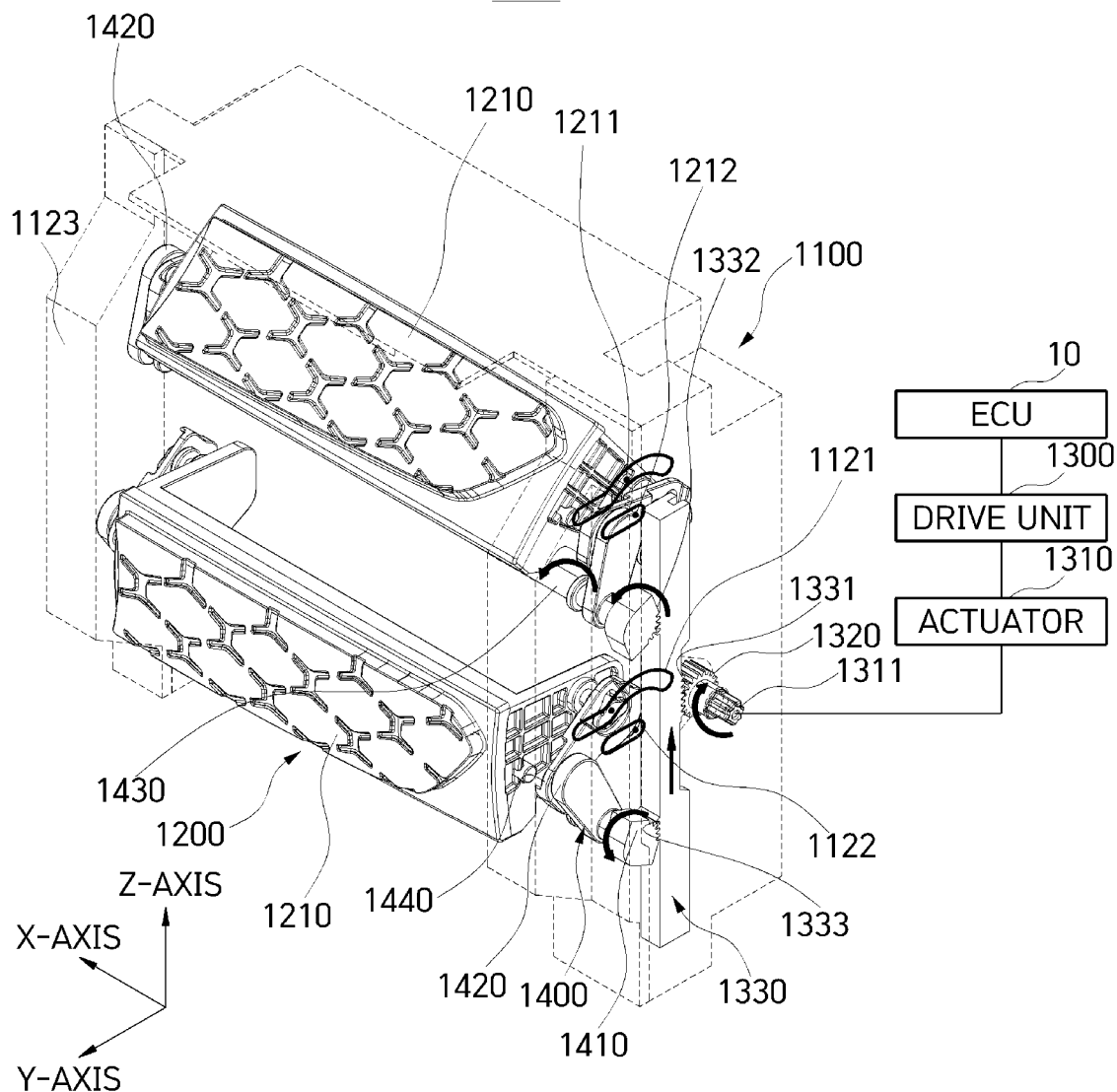
Figure 12:
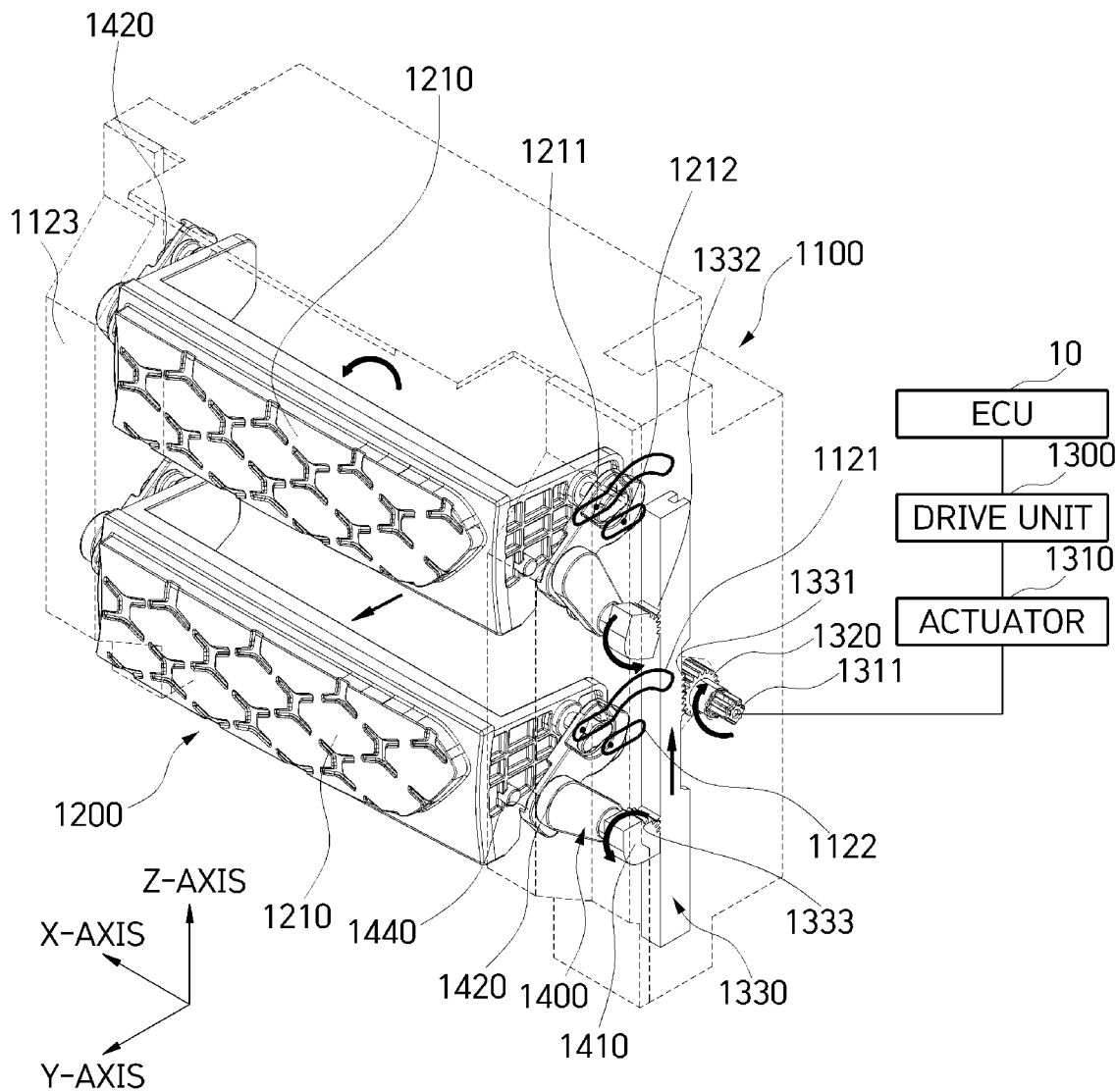
Figure 13:
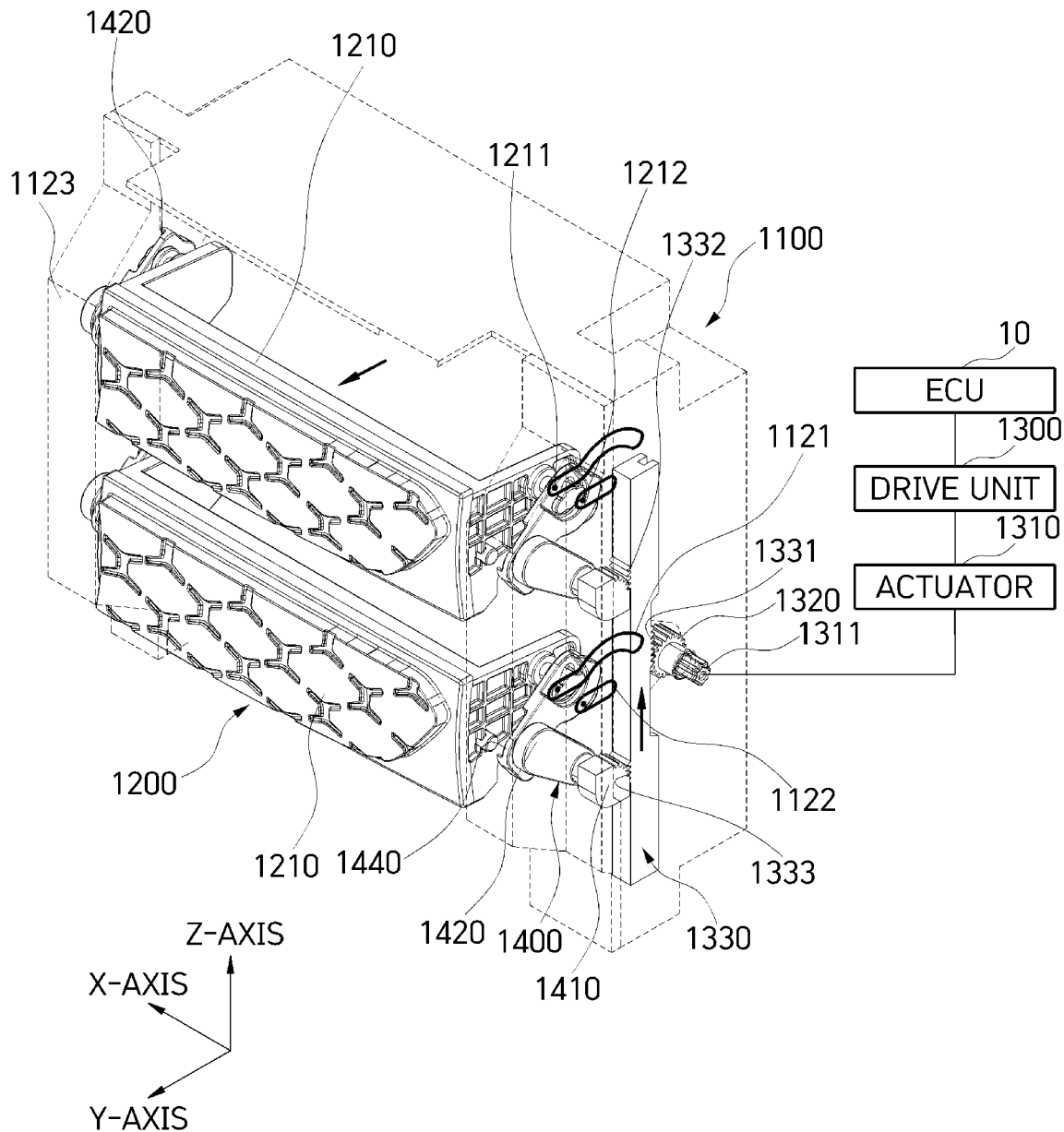

Advantages and features of the present disclosure and methods of achieving them will become apparent with reference to the embodiments described below in detail in conjunction with the accompanying drawings. The present disclosure may, however, be embodied in different forms, and should not be construed as being limited to the embodiments set forth herein. Rather, these embodiments are provided so that the disclosure will be thorough and complete, and will fully convey the scope of the present disclosure to those skilled in the art. The present disclosure should be defined based on the entire content set forth in the appended claims. Meanwhile, the terms used herein are for the purpose of describing the embodiments and are not intended to limit the disclosure. As used herein, the singular forms "a", "an" and "the" are intended to include the plural forms as well, unless context clearly indicates otherwise. It will be understood that the terms "comprises/includes" and/or "comprising/including" when used in the specification, specify the presence of stated components, steps, motions, and/or elements, but do not preclude the presence or addition of one or more other components, steps, motions, and/or elements. As used herein, the term "and/or" includes any one and any combination of one or more of those listed items.

Hereinafter, exemplary embodiments of the present disclosure will be described in detail with reference to the accompanying drawings.

Representation of Coordinate System

The X-, Y-, and Z-axes shown in the drawings of the present disclosure represent a three-dimensional Cartesian coordinate system in which coordinates of points or vectors are displayed on the basis of straight coordinate axes intersecting perpendicularly to each other. In that coordinate system, for convenience of description, the X-axis may be described as an axis representing the width direction (lateral direction) of the vehicle body, the Y-axis may be described as an axis representing the longitudinal direction (forward-rearward direction) of the vehicle body, and the Z-axis may be described as an axis representing the vertical direction (upward-downward direction) of the vehicle body.

Each of the X-, Y-, and Z-axis directions includes a positive direction and a negative direction.

The positive direction of the X-axis refers to a right width direction of the vehicle body, and the negative direction of the X-axis refers a left width direction of the vehicle body.

The positive direction of the Y-axis refers to a front (forward) longitudinal direction of the vehicle body from an imaginary origin connected to the X-axis, and the negative direction of the Y-axis refers to a rear (rearward) longitudinal direction of the vehicle body from the origin.

The positive direction of the Z-axis refers to a roof direction of the vehicle body, and the negative direction of the Z-axis refers to a floor direction of the vehicle body.

The positive and negative directions of each axis may be collectively described based on the same or different specific reference points for convenience of description.

For example, although the positive direction of the Y-axis refers to the front, and the negative direction of the Y-axis refers to the rear in the present disclosure, the positive and negative directions may be determined based on any one reference point and the reference point may vary with each structure.

First Embodiment (FIGS. 1 to 13)

FIGS. 1 to 4 schematically illustrate a basic configuration of an active air flap and an inter-configuration mechanism thereof according to a first embodiment of the present disclosure.

Referring to FIGS. 1 to 4, the active air flap, which is designated by reference numeral 1000, has a multi-flap structure to open and close an outside air inlet formed in a grill of a vehicle 1. The active air flap 1000 helps to improve driving safety of the vehicle 1 and to improve fuel efficiency by reducing air resistance generated while the vehicle 1 is traveling.

The active air flap 1000 includes a frame unit 1100, a flap unit 1200, a drive unit 1300, and a link unit 1400.

The frame unit 1100 is in the form of a rectangular frame.

The frame unit 1100 may be screwed to the back of the grill. The frame unit 1100 may have separate fixing holes formed therearound so as to be securely coupled to the grill by screws passing through the holes.

The frame unit 1100 has a hollow structure in which horizontal and vertical frames 1110 and 1120 thereof are connected to each other, and is configured to communicate with the outside air inlet of the grill.

The horizontal frame 1110 is composed of two panels spaced apart from each other in a vertical direction (the positive-negative direction of the Z-axis) in the region of the outside air inlet on the back of the grill.

When the grill is viewed from the front, the horizontal frame 1110 is not exposed to the outside because it is covered by the grill, and the constituent panels thereof may be disposed at respective inner upper and lower ends of the outside air inlet.

The vertical frame 1120 is composed of two panels spaced apart from each other in a horizontal direction in the region of the outside air inlet on the back of the grill.

When the grill is viewed from the front, the vertical frame 1120 is not exposed to the outside because it is covered by the grill, and the constituent panels thereof may be disposed at both inner ends of the outside air inlet.

The vertical frame 1120 includes a first guide groove 1121 having a straight section 1121a and a curved section 1121b formed as a single path and configured to guide an opening/closing path of an associated flap member 1210, and a second guide groove 1122 having a step spaced apart from the first guide groove 1121 and configured to guide a straight path of the flap member 1210.

The flap unit 1200 is rotatably connected to the frame unit 1100 to sequentially open and close the outside air inlet of the grill.

The flap unit 1200 includes the flap member 1210, a first guide protrusion 1211, and a second guide protrusion 1212.

The flap member 1210 is rotatably connected to the frame unit 1100 to open and close the outside air inlet.

If the outside air inlet is opened, the flap member 1210 moves linearly in the negative direction of the Y-axis via the straight section 1121a of the first guide groove 1121 and the second guide groove 1122 having a straight section, and then rotates rearward (in the negative direction of the Y-axis) via the curved section 1121b of the first guide groove 1121.

On the contrary, if the outside air inlet is closed, the flap member 1210 is operated in the reverse order of the mechanism for opening the outside air inlet. That is, the flap member 1210 rotates forward (in the positive direction of the Y-axis) due to the curved section 1121b of the first guide groove 1121, and then returns to its initial position via the straight section 1121a of the first guide groove 1121 and the second guide groove 1122 in sequence.

The first guide protrusion 1211 protrudes from each end of the flap member 1210, and is movable on the first guide groove 1121.

The second guide protrusion 1212 protrudes from each end of the flap member 1210 while being spaced apart from the first guide protrusion 1211 by a predetermined interval. The second guide protrusion 1212 is movable on the second guide groove 1122.

When the flap member 1210 opens and closes the outside air inlet, the second guide protrusion 1212 may be positioned at the rear end of the second guide groove 1122 to function as an axis of rotation of the flap member 1210.

The drive unit 1300 provides a driving force to the flap unit 1200.

The drive unit 1300 is actuated by an electronic control unit (ECU) 10 to cause a plurality of flap members to sequentially open and close the outside air inlet.

The drive unit 1300 includes an actuator 1310, a driving pinion gear 1320, and a rack 1330.

The actuator 1310 may be a motor that rotates its drive shaft 1311 to transmit a driving force to the flap unit 1200, and may be connected to one side of the frame unit 1100.

The driving pinion gear 1320 is connected to the drive shaft 1311 to rotate in conjunction with the drive shaft 1311.

The rack 1330 is embedded in the vertical frame 1120 (integrally and/or separately included in the vertical frame), and is engaged, at one side in the width direction thereof (corresponding to the negative direction of the Y-axis with respect to the body of the rack), with the driving pinion gear 1320 so that the rack 1330 moves up and down in a controlled manner. Accordingly, the rack 1330 serves to transmit a driving force to the link unit 1400 engaged with the rack 1330 at the other side in the width direction thereof (corresponding to the positive direction of the Y-axis with respect to the body of the rack).

The rack 1330 includes a driving tooth 1331 and first and second driven teeth 1332 and 1333.

The driving tooth 1331 is positioned in a partial section of one side in the width direction of the rack 1330 engaged with the driving pinion gear 1320.

The first and second driven teeth 1332 and 1333 are arranged at a distance from each other on the other side in the width direction of the rack 1330, so as to transmit a rotational driving force to the link unit 1400. In this case, although the first and second driven teeth 1332 and 1333 are illustrated for convenience of description, the present disclosure is not limited thereto. For example, n driven teeth may also be provided (where n is a natural number).

The link unit 1400 is connected between the flap unit 1200 and the drive unit 1300 to transmit a driving force from the drive unit 1300 to the flap unit 1200.

The link unit 1400 includes a driven pinion gear 1410, a link bar 1420, a loader shaft 1430, and a link panel 1440.

The driven pinion gear 1410 engages with the first and second driven teeth 1332 and 1333. Therefore, the driven pinion gear 1410 may rotate in conjunction with the first and second driven teeth 1332 and 1333 along with the raising or lowering (movement in the positive or negative direction of the Z-axis) of the rack 1330.

One end of the link bar 1420 rotates in conjunction with the driven pinion gear 1410. The link bar 1420 is positioned at each end of the flap member 1210.

The loader shaft 1430 connects a plurality of link bars 1420 positioned at both ends of the flap member 1210.

Each link panel 1440 connects the other end of an associated one of the link bars 1420 to the first guide protrusion 1211 protruding from the associated end of the flap member 1210. In this case, the link panel 1440 may be rotatably connected to the other end of the link bar 1420.

The drive unit 1300 and the link unit 1400 may be provided inside or outside the vertical frame 1120. If the drive unit 1300 and the link unit 1400 are embedded in the vertical frame 1120, each of the drive unit 1300 and the link unit 1400 may have a portion, which protrudes from the vertical frame 1120 and is covered by a cover 1123. In this case, the cover 1123 may be fastened to the front of the vertical frame 1120 by snap-fit.

In a modification of the first embodiment, the active air flap for vehicles 1000 may further include a separate fixing unit (not shown in the first embodiment).

For example, the fixing unit may be disposed on the sliding path of the flap member 1210 to prevent the flap member 1210 from being pushed rearward or twisted due to aerodynamics when a fixing protrusion (not shown in the first embodiment) protruding from each end of the flap member 1210 is seated thereon. In this case, the fixing unit may have therein a fixing groove corresponding to the fixing protrusion, and may be made of an elastic material capable of shock mitigation.

FIGS. 5 to 13 illustrate a state in which the active air flap is sequentially opened or closed according to the first embodiment of the present disclosure.

First, referring to FIGS. 5 to 9, the active air flap 1000 according to the first embodiment of the present disclosure may be sequentially opened.

The mechanism for opening the active air flap 1000 is as follows.

Firstly, the actuator 1310 of the drive unit 1300 is actuated in response to the command from the ECU 10, and the driving pinion gear 1320 connected to the drive shaft 1311 of the actuator 1310 engages with the driving tooth 1331 of the rack 1330 to rotate counterclockwise.

Secondly, as the driving pinion gear 1320 rotates counterclockwise, the rack 1330 converts the rotational motion of the driving pinion gear 1320 into a linear motion and moves linearly downward (in the negative direction of the Z-axis).

Thirdly, the driven pinion gear 1410 positioned at each end of each of the upper and lower flap members 1210 disposed on the frame unit 1100 engages with the first and second driven teeth 1332 and 1333 of the associated rack 1330 to rotate clockwise. Through this operation, the driven pinion gear 1410 converts the linear motion from the rack 1330 back into a rotational motion.

Fourthly, the link bar 1420 rotating coaxially with the driven pinion gear 1410 rotates clockwise (in the negative direction of the Y-axis). The link panel 1440 connected to the link bar 1420 is pushed rearward (in the negative direction of the Y-axis).

Fifthly, the first guide protrusion 1211 connected to the link panel 1440 passes through the straight section 1121*a* and the curved section 1121*b* of the first guide groove 1121 in sequence. Thus, the flap member 1210 rotates clockwise (in the negative direction of the Y-axis) and gradually opens the outside air inlet. In this process, the second guide protrusion 1212 moves linearly to the rear end (in the negative direction of the Y-axis) of the second guide groove 1122 when the first guide protrusion 1211 moves in the negative direction of the Y-axis through the straight section 1121*a* of the first guide groove 1121. Then, the second guide protrusion 1212 serves as an axis of rotation of the flap member 1210 that rotates rearward (in the negative direction of the Y-axis) in place (at the rear end of the second guide groove 1122), when the first guide protrusion 1211 moves through the curved section 1121*b* of the first guide groove 1121.

Consequently, the active air flap for vehicles 1000 can effectively control an opening area of the flap member 1210 through sequential opening thereof.

Next, referring to FIGS. 10 to 13, the active air flap 1000 according to the first embodiment of the present disclosure may be sequentially closed.

The mechanism for closing the active air flap 1000 is as follows.

Firstly, the actuator 1310 of the drive unit 1300 is actuated in response to the command from the ECU 10, and the driving pinion gear 1320 connected to the drive shaft 1311 of the actuator 1310 engages with the driving tooth 1331 of the rack 1330 to rotate clockwise.

Secondly, as the driving pinion gear 1320 rotates clockwise, the rack 1330 converts the rotational motion of the driving pinion gear 1320 into a linear motion and moves linearly upward (in the positive direction of the Z-axis).

Thirdly, the driven pinion gear 1410 positioned at each end of each of the upper and lower flap members 1210 disposed on the frame unit 1100 engages with the first and second driven teeth 1332 and 1333 of the associated rack 1330 to rotate counterclockwise. Through this operation, the driven pinion gear 1410 converts the linear motion from the rack 1330 back into a rotational motion.

Fourthly, the link bar 1420 rotating coaxially with the driven pinion gear 1410 rotates counterclockwise (in the positive direction of the Y-axis). The link panel 1440 connected to the link bar 1420 is pulled forward (in the positive direction of the Y-axis).

Fifthly, the first guide protrusion 1211 connected to the link panel 1440 passes through the curved section 1121*b* and the straight section 1121*a* of the first guide groove 1121 in sequence. Thus, the flap member 1210 rotates counterclockwise (in the positive direction of the Y-axis) and gradually closes the outside air inlet. In this process, the second guide protrusion 1212 serves as an axis of rotation of the flap member 1210 and rotates in place until the first guide protrusion 1211 enters the straight section 1121*a* from the curved section 1121*b* of the first guide groove 1121. Then, the second guide protrusion 1212 moves linearly to the front end (in the positive direction of the Y-axis) of the second guide groove 1122 when the first guide protrusion 1211 moves forward (in the positive direction of the Y-axis) through the straight section 1121*a* of the first guide groove 1121. Accordingly, the flap member 1210 returns to its initial position and maintains the outside air inlet of the grill to be closed.

Second Embodiment (FIGS. 14 to 18)

Figure 14:
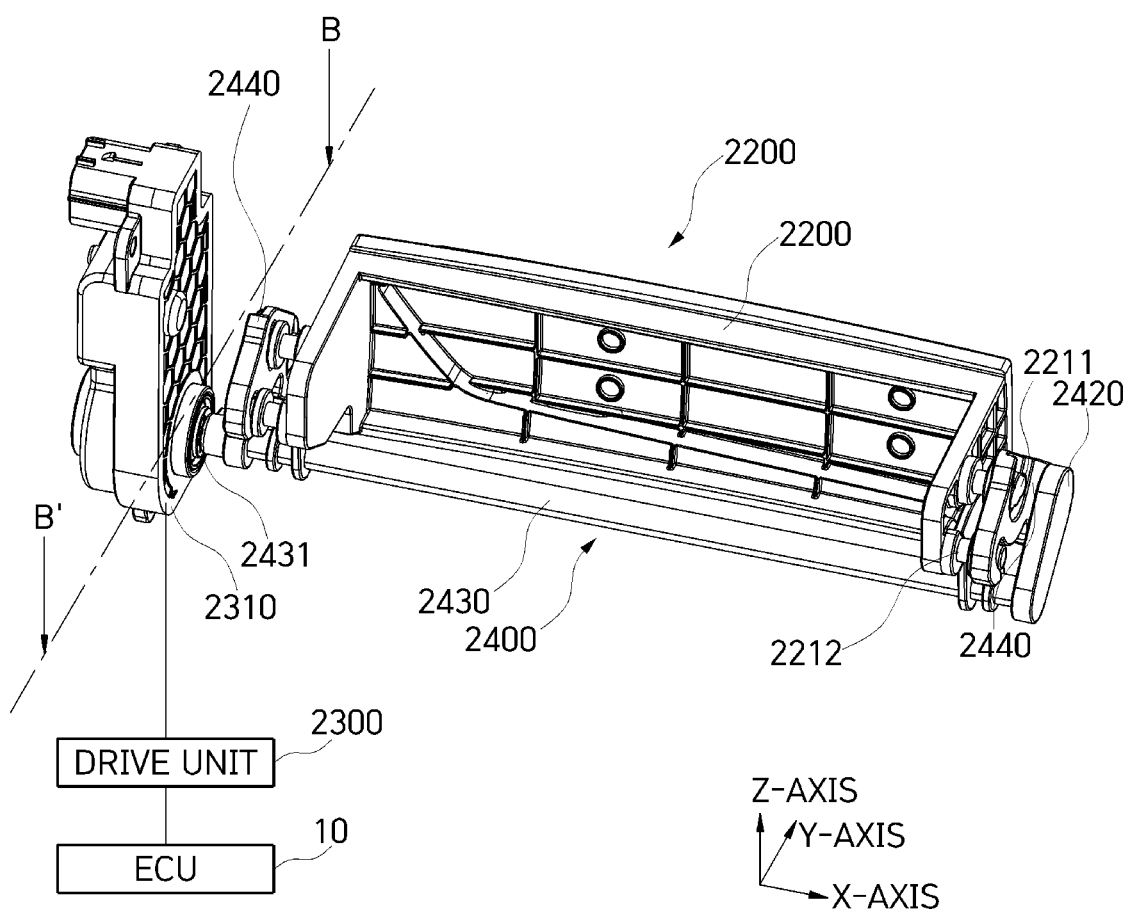
FIG. 14 is a perspective view schematically illustrating an active air flap according to a second embodiment of the present disclosure.

FIG. 14 is a perspective view schematically illustrating an active air flap according to a second embodiment of the present disclosure.

Referring to FIG. 14, the active air flap, which is designated by reference numeral 2000, according to the second embodiment has a single flap structure. Although a frame unit (or frame, which is the same as that in the first embodiment) is not illustrated in the active air flap 2000 in order to intuitively express the features of the configuration, the frame unit may be included in the active air flap 2000 of the second embodiment.

In summary, the active air flap 2000 of the second embodiment includes a loader shaft 2430 used to prevent each flap member 2210 from being twisted due to an external force (aerodynamics, high-pressure water for washing, or the like).

For example, the active air flap 2000 of the present embodiment is configured such that an actuator 2310 is connected to only one side of the active air flap 2000 and the loader shaft 2430 functions as a drive shaft of the actuator

2310. In this case, the loader shaft 2430 is as long as the flap member 2210 to reinforce the rigidity of the flap member 2210.

In particular, since a link bar 2420 positioned at each end of the flap member 2210 is connected to each longitudinal end of the loader shaft 2430, the actuator 2310 may rotate the flap member 2210 without a problem even if the actuator 2310 is actuated only on one side of the active air flap 2000.

Specifically, the active air flap 2000 of the second embodiment includes a flap unit 2200, a drive unit 2300, and a link unit 2400.

The flap unit 2200 has an operating mechanism in which the linear movement and curved movement thereof are performed in a single path, and opens and closes the outside air inlet of the grill.

The flap unit 2200 may be connected to the frame unit (not shown) communicating with the outside air inlet of the radiator grill or may be connected directly to the grill, for rotation.

The flap unit 2200 includes the flap member 2210, a first guide protrusion 2211, and a second guide protrusion 2212. Since those components are the same as those of the above-mentioned first embodiment, a detailed description thereof will be omitted.

The drive unit 2300 provides a driving force to the flap unit 2200. In this case, the drive unit 2300 is actuated by an electronic control unit (ECU) 10 to cause the flap member 2210 to sequentially open and close the outside air inlet.

The link unit 2400 is connected between the flap unit 2200 and the drive unit 2300 to transmit a driving force from the actuator 2310 of the drive unit 2300 to the flap unit 2200.

The link unit 2400 includes the link bar 2420, the loader shaft 2430, and a link panel 2440.

The link bar 2420 serves to restrain each end of the flap member 2210, is in the form of a long bar, and has a chamfered longitudinal end.

The loader shaft 2430 connects a plurality of link bars 2420 positioned at both ends of the flap member 2210. The loader shaft 2430 is connected to one end of each of the link bars 2420.

The loader shaft 2430 mainly functions to transmit the power of the actuator 2310 to both ends of the flap member 2210 while preventing the power from being biased to either side. Thereby, the loader shaft 2430 prevents the flap member 2210 from being twisted by providing uniform power to both ends of the flap member 2210. This is meaningful in that the flap member 2210 is flush with the radiator grill.

One end of the loader shaft 2430 may be connected directly to the actuator 2310 to function as a shaft rotated in conjunction with the rotational actuation of the actuator 2310.

In another example, a shaft gear 2431 may be provided at one end of the loader shaft 2430. The shaft gear 2431 may be connected between the rotary shaft of the actuator 2310 and the loader shaft 2430 so as to serve as a medium that allows the rotary shaft of the actuator 2310 and the loader shaft 2430 to rotate in conjunction with each other.

The rotary shaft of the actuator 2310 may have an inner circumferential surface corresponding to the outer circumferential surface of the shaft gear 2431, and may have a hollow structure into which the shaft gear 2431 is inserted. In this case, the rotary shaft of the actuator 2310 may be detachable from the actuator 2310.

Each link panel 2440 connects the other end of the associated link bar 2420 to the first guide protrusion 2211 protruding from the associated end of the flap member 2210. The link panel 2440 may be rotatably connected to the other end of the link bar 2420.

In a modification of the second embodiment, the active air flap 2000 may further include a separate fixing unit (not shown in the second embodiment).

For example, the fixing unit may be disposed on the sliding path of the flap member 2210 to prevent the flap member 2210 from being pushed rearward or twisted due to aerodynamics when a fixing protrusion (not shown in the second embodiment) protruding from each end of the flap member 2210 is seated thereon. In this case, the fixing unit may have therein a fixing groove corresponding to the fixing protrusion, and may be made of an elastic material capable of shock mitigation.

Figure 15:
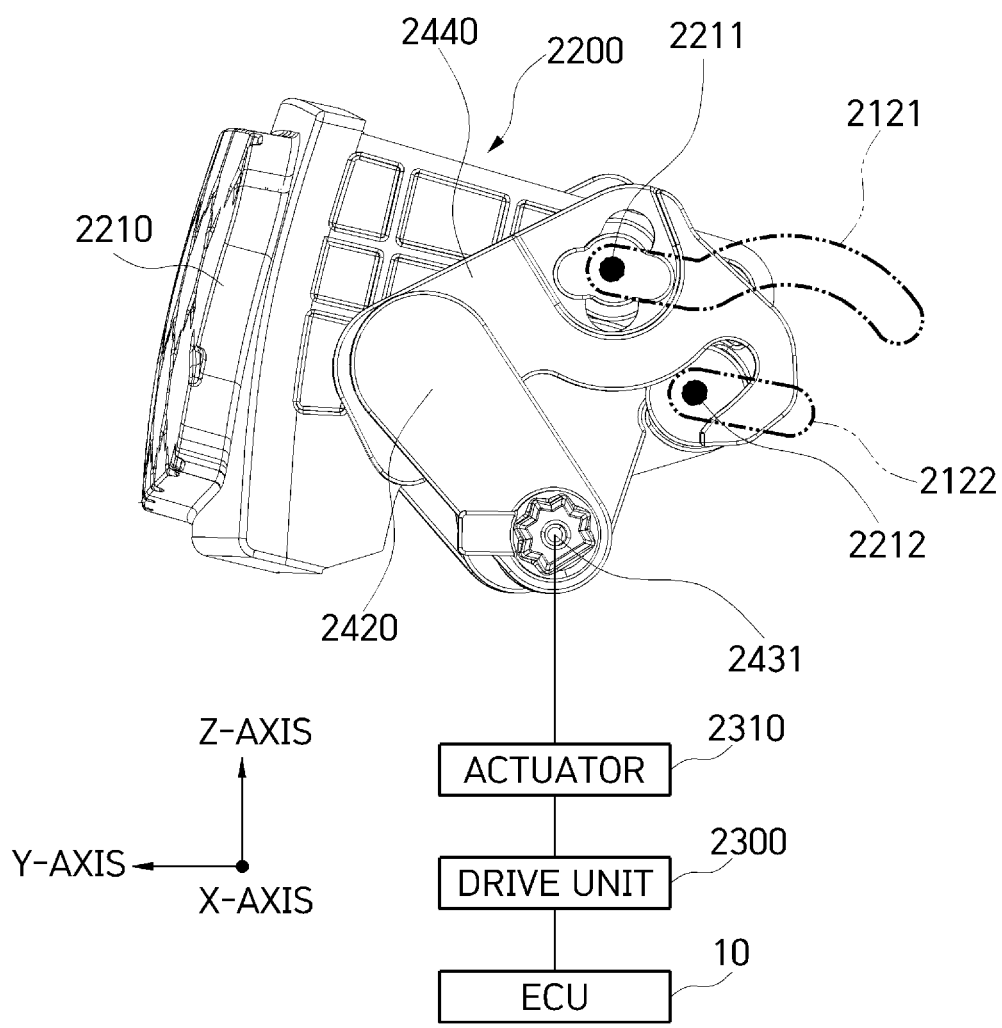
FIGS. 15 and 16 are cross-sectional views taken along B-B of FIG. 14 and illustrate a state in which the active air flap is opened according to the second embodiment of the present disclosure.
Figure 16:
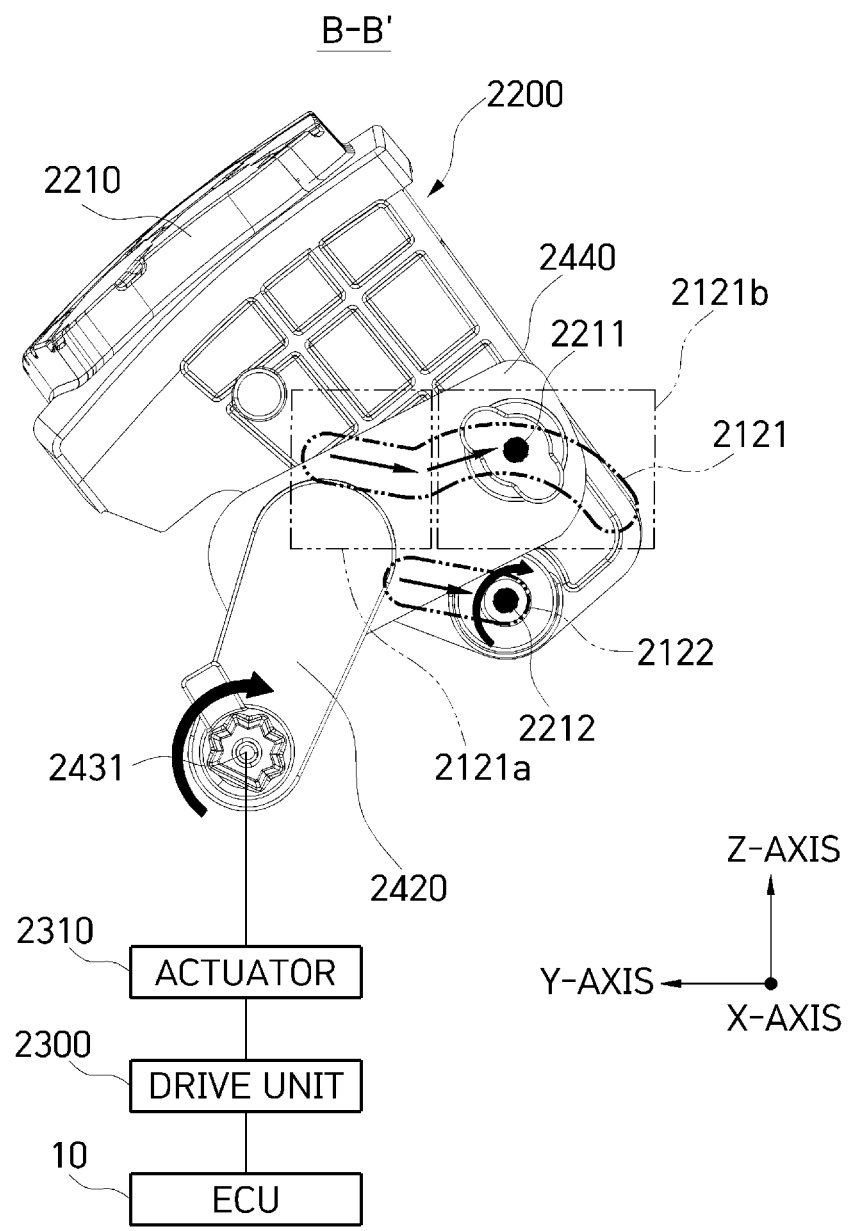

FIGS. 15 and 16 are cross-sectional views taken along B-B of FIG. 14 and illustrate a state in which the active air flap is opened according to the second embodiment of the present disclosure.

Referring to FIGS. 15 and 16, the mechanism for opening the active air flap 2000 according to the second embodiment of the present disclosure is as follows.

Firstly, the actuator 2310 of the drive unit 2300 is actuated in response to the command from the ECU 10, and the shaft gear 2431 connected to one end of the loader shaft 2430 is connected to the shaft of the actuator 2310 to rotate clockwise (in the negative direction of the Y-axis).

Secondly, the link bar 2420 connected coaxially to the shaft gear 2431 rotates clockwise in conjunction with the shaft gear 2431. The link panel 2440 connected to the link bar 2420 is pushed rearward (in the negative direction of the Y-axis).

Thirdly, the first guide protrusion 2211 connected to the link panel 2440 passes through a straight section 2121a and a curved section 2121b of the first guide groove 2121 in sequence. Thus, the flap member 2210 rotates clockwise (in the negative direction of the Y-axis) and gradually opens the outside air inlet.

In this process, the second guide protrusion 2212 moves linearly to the rear end (in the negative direction of the Y-axis) of a second guide groove 2122 when the first guide protrusion 2211 moves in the negative direction of the Y-axis through the straight section 2121a of the first guide groove 2121.

Then, the second guide protrusion 2212 serves as an axis of rotation of the flap member 2210 that rotates rearward (in the negative direction of the Y-axis) in place (at the rear end of the second guide groove 2122), when the first guide protrusion 2211 moves through the curved section 2121b of the first guide groove 2121.

Consequently, the active air flap 2000 can effectively control an opening area of the flap member 2210.

Figure 17:
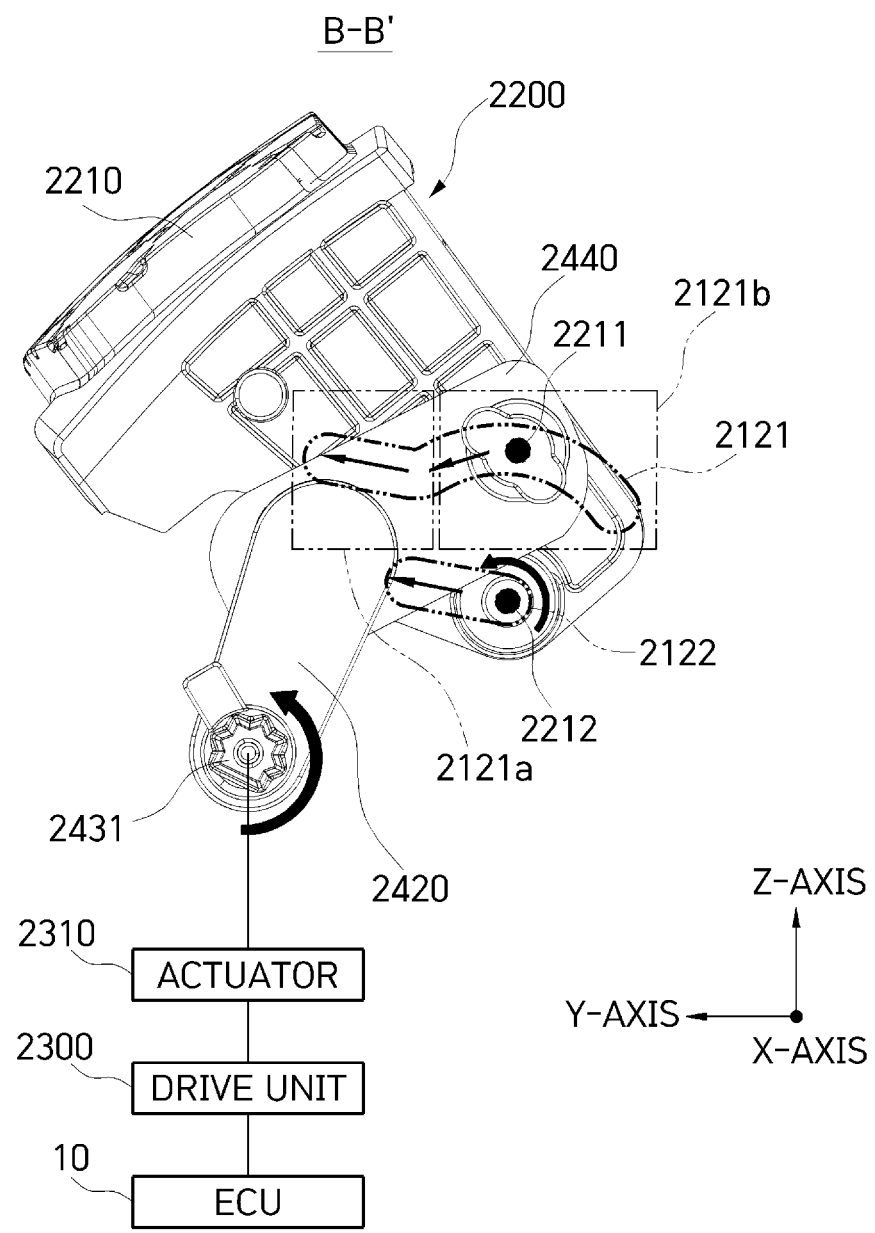
FIGS. 17 and 18 are cross-sectional views taken along B-B of FIG. 14 and illustrate a state in which the active air flap is closed according to the second embodiment of the present disclosure.
Figure 18:
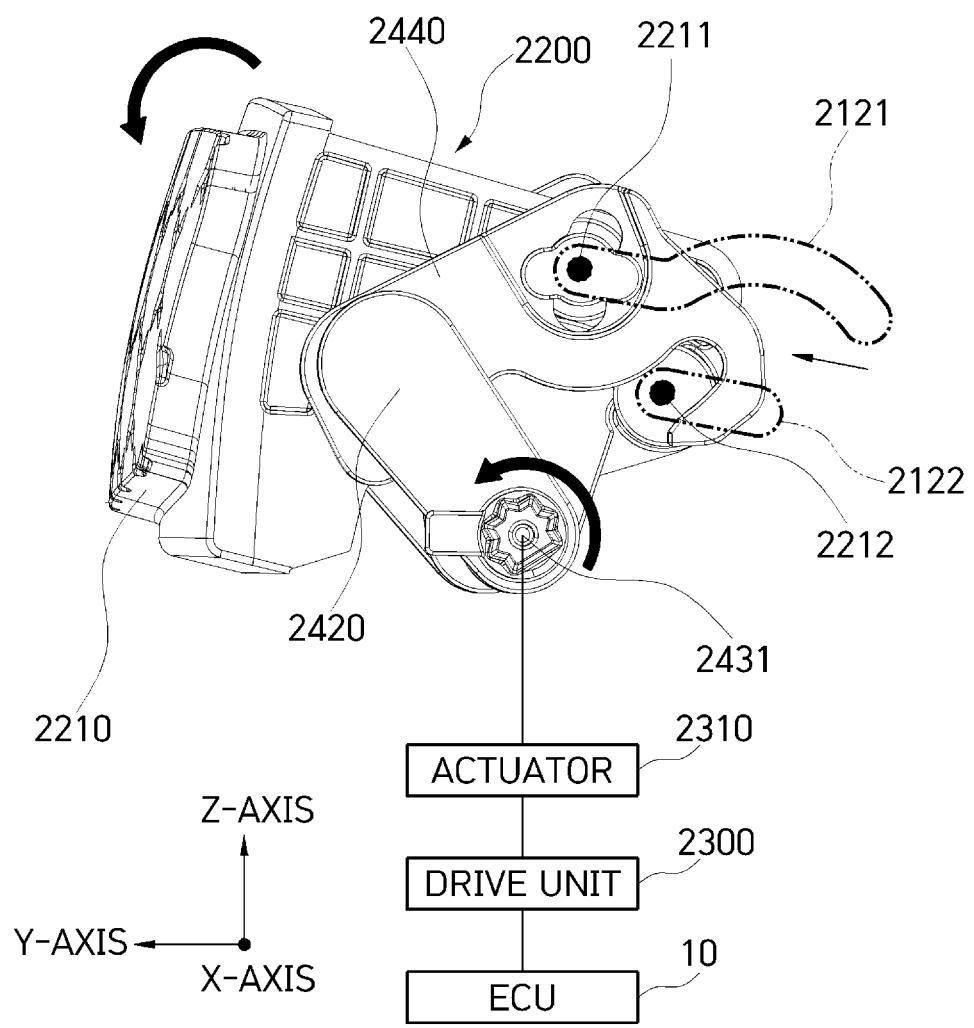

FIGS. 17 and 18 are cross-sectional views taken along B-B of FIG. 14 and illustrate a state in which the active air flap is closed according to the second embodiment of the present disclosure.

Referring to FIGS. 17 and 18, the mechanism for closing the active air flap 2000 according to the second embodiment of the present disclosure is as follows.

Firstly, the actuator 2310 of the drive unit 2300 is actuated in response to the command from the ECU 10, and the shaft gear 2431 connected between one end of the loader shaft 2430 and the shaft of the actuator 2310 rotates counterclockwise (in the positive direction of the Y-axis) in conjunction with the shaft of the actuator 2310.

Secondly, the link bar 2420 connected coaxially to the shaft gear 2431 rotates counterclockwise in conjunction with the shaft gear 2431. The link panel 2440 connected to the link bar 2420 is pulled forward (in the positive direction of the Y-axis).

Thirdly, the first guide protrusion 2211 connected to the link panel 2440 passes through the curved section 2121*b* and the straight section 2121*a* of the first guide groove 2121 in sequence. Thus, the flap member 2210 rotates counterclockwise (in the positive direction of the Y-axis) and gradually closes the outside air inlet.

In this process, the second guide protrusion 2212 serves as an axis of rotation of the flap member 2210 and rotates in place until the first guide protrusion 2211 enters the straight section 2121*a* from the curved section 2121*b* of the first guide groove 2121.

Then, the second guide protrusion 2212 moves linearly to the front end (in the positive direction of the Y-axis) of the second guide groove 2122 when the first guide protrusion 2211 moves forward (in the positive direction of the Y-axis) through the straight section 2121*a* of the first guide groove 2121. Accordingly, the flap member 2210 returns to its initial position and maintains the outside air inlet of the grill to be closed.

Third Embodiment (FIGS. 19 to 30)

Figure 19:
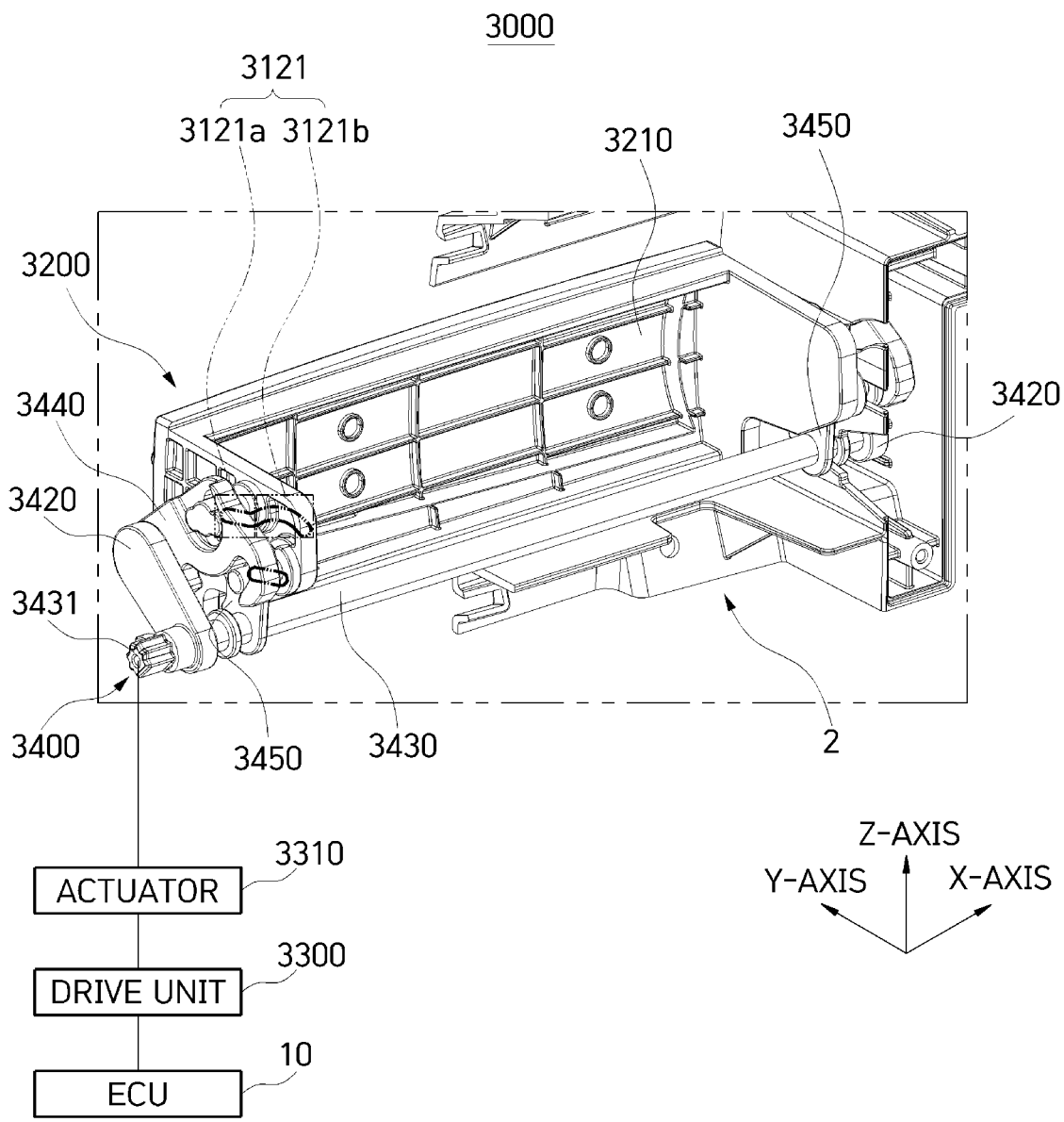
FIG. 19 is a perspective view schematically illustrating an active air flap according to a third embodiment of the present disclosure.
Figure 20:
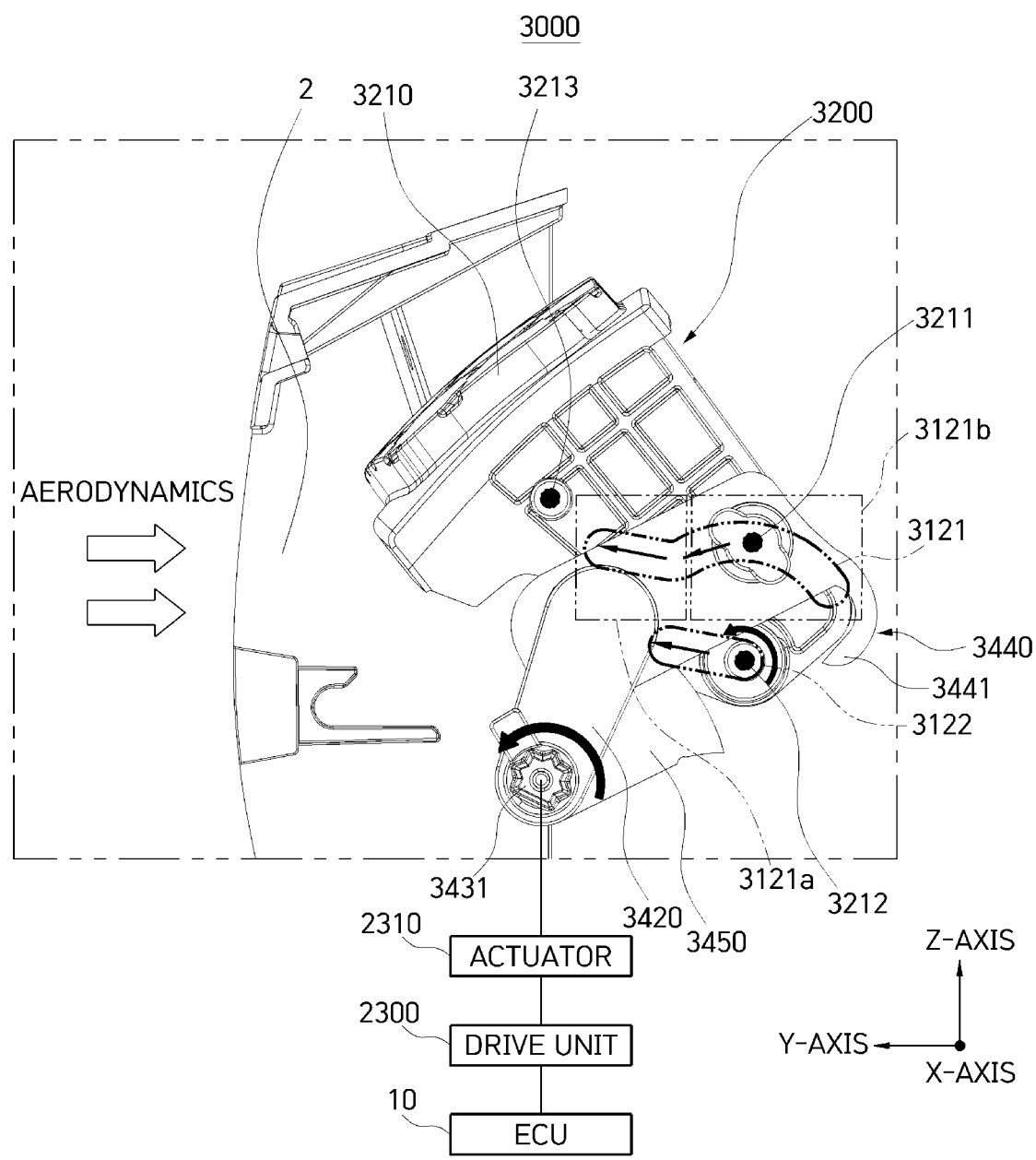
FIG. 20 is a side cross-sectional view illustrating a structural feature of the active air flap according to the third embodiment of the present disclosure.
Figure 22:
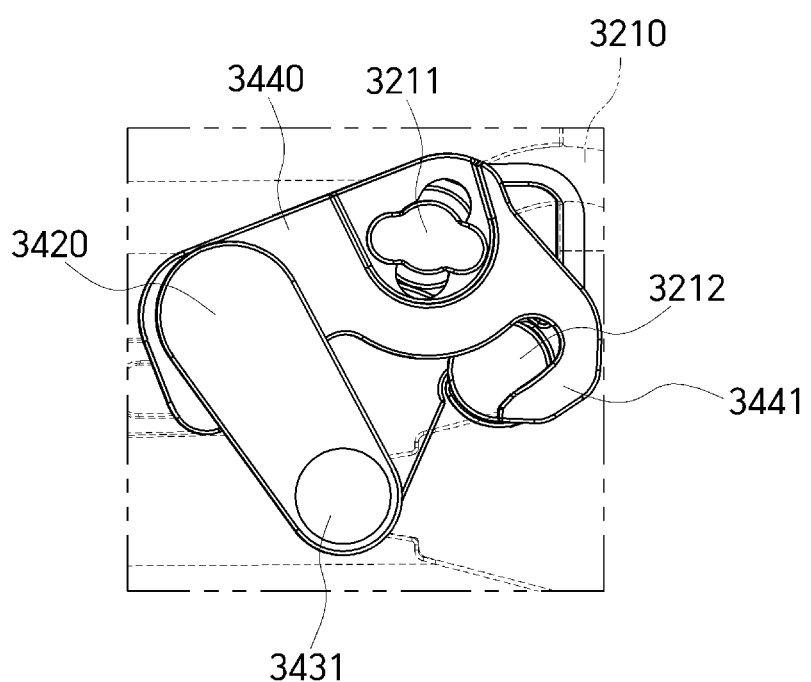
FIG. 22 is a side cross-sectional view illustrating an operation of a link panel of the active air flap according to the third embodiment of the present disclosure.
Figure 23:
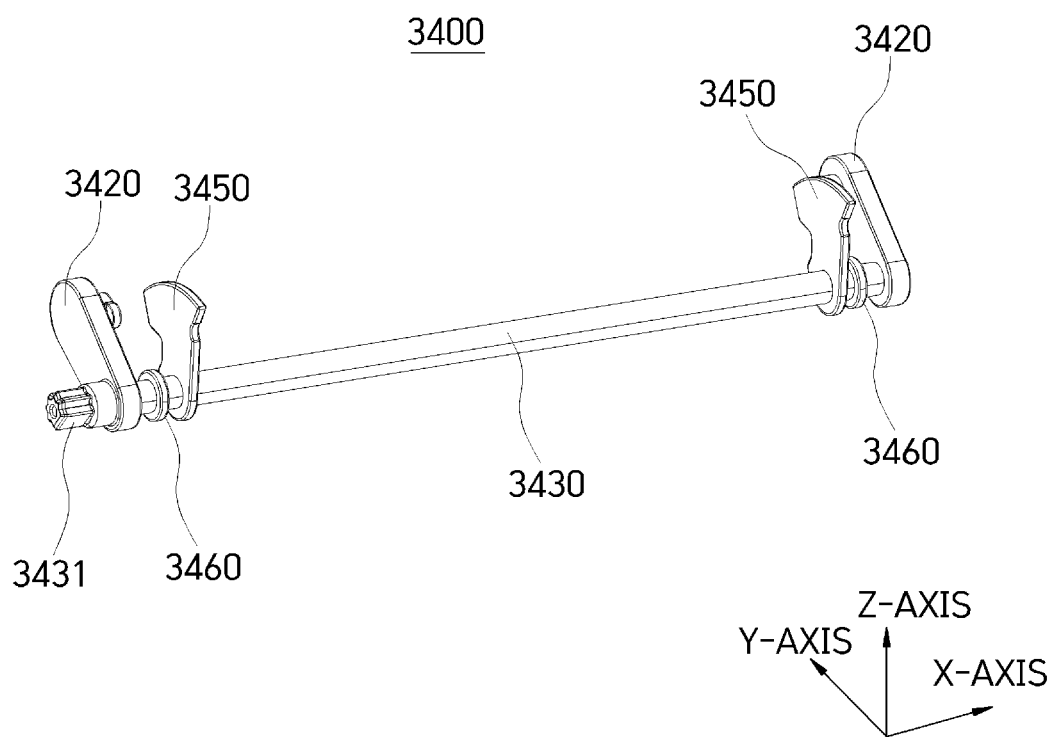
FIG. 23 is a partial perspective view schematically illustrating a configuration of a link unit in the active air flap according to the third embodiment of the present disclosure.
Figure 24:
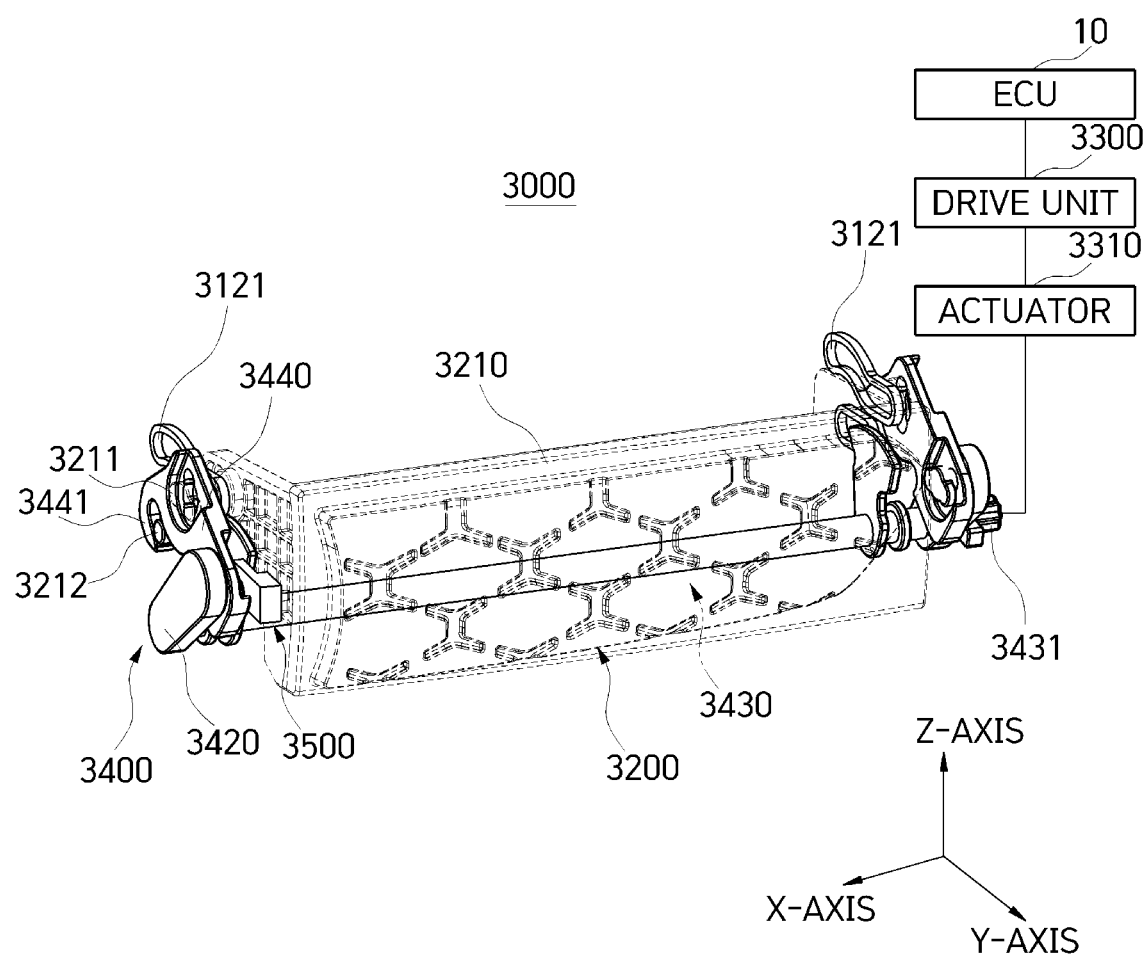
FIGS. 24 to 27 are exemplary views illustrating a state in which the active air flap is sequentially opened according to the third embodiment of the present disclosure.
Figure 25:
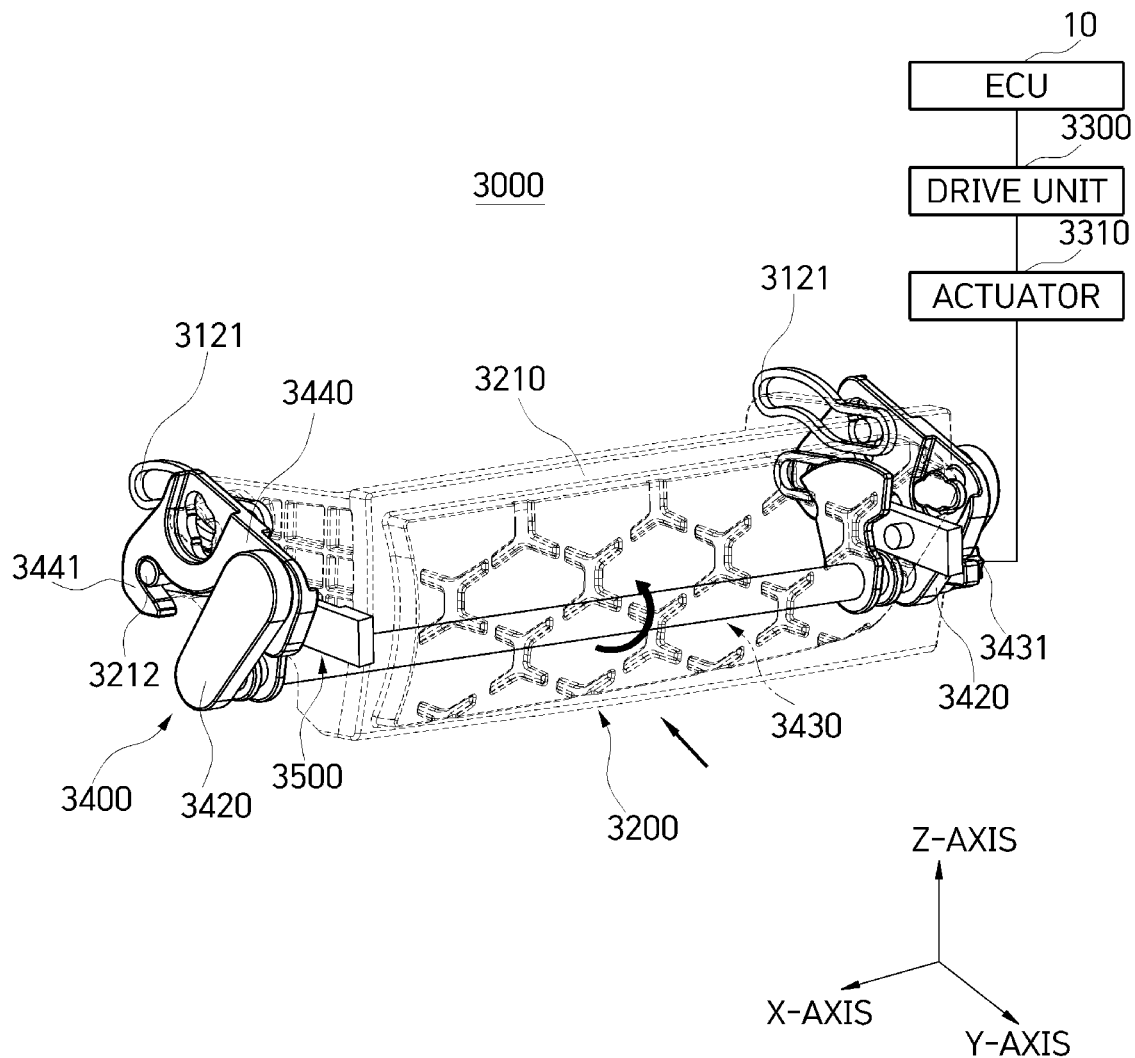
Figure 26:
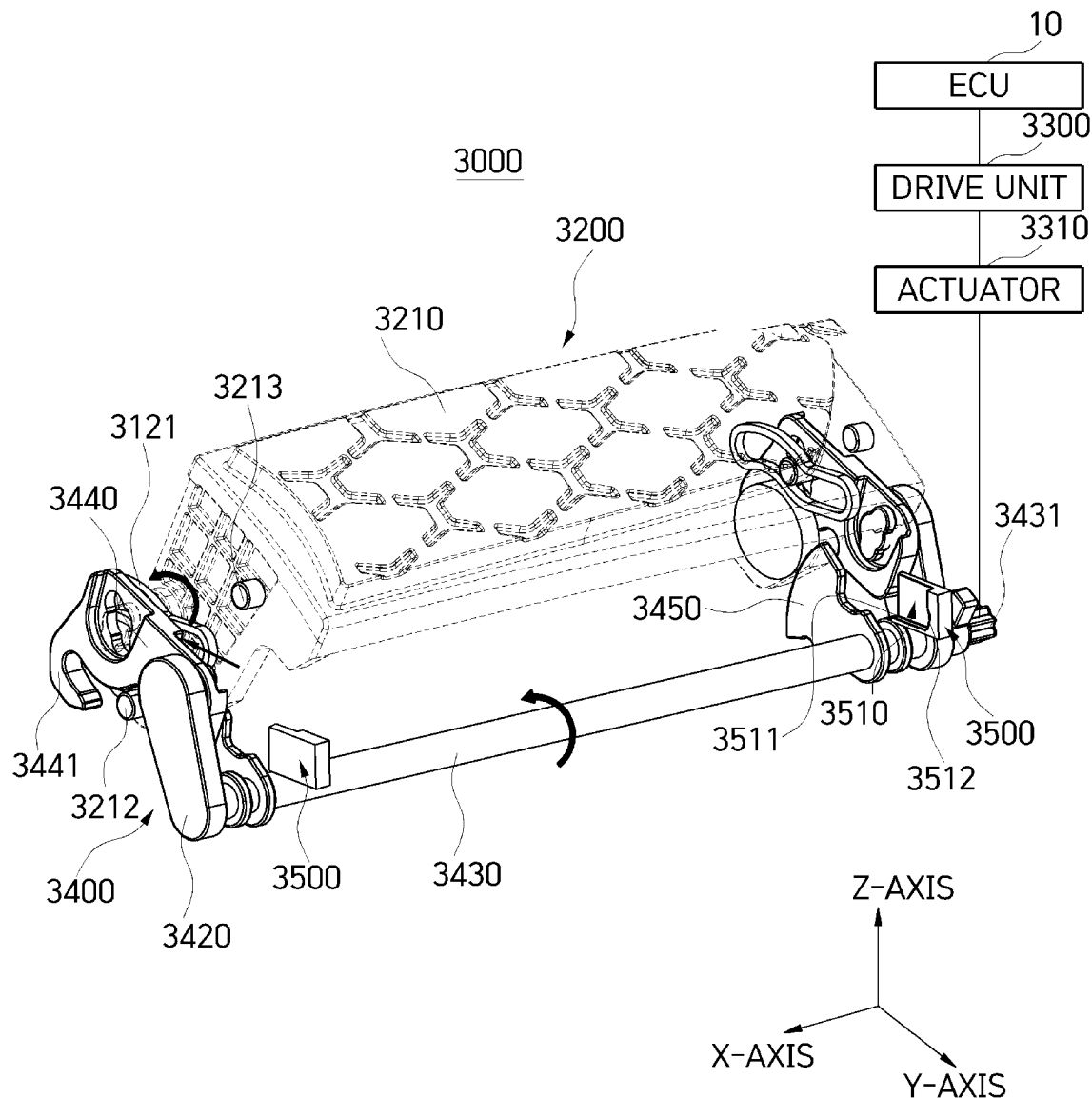
Figure 27:
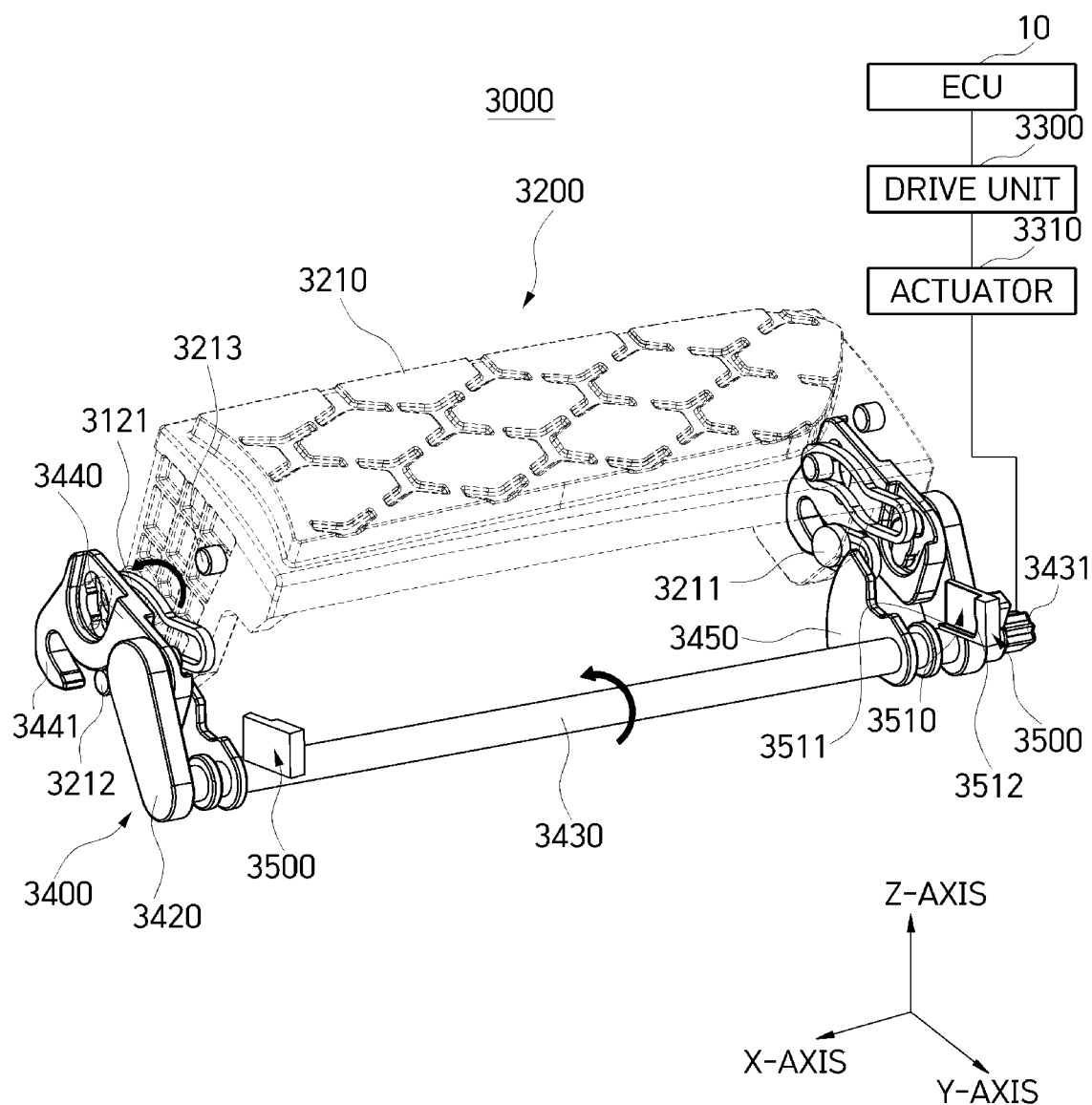

FIG. 19 is a perspective view schematically illustrating an active air flap according to a third embodiment of the present disclosure. FIG. 20 is a side cross-sectional view illustrating a structural feature of the active air flap according to the third embodiment of the present disclosure. FIG. 21 is a side cross-sectional view illustrating an operation of a stopper in the process of opening and closing the active air flap according to the third embodiment of the present disclosure. FIG. 22 is a side cross-sectional view illustrating an operation of a link panel of the active air flap according to the third embodiment of the present disclosure. FIG. 23 is a partial perspective view schematically illustrating a configuration of a link unit.

Referring to FIGS. 19 to 23, the active air flap, which is designated by reference numeral 3000, according to the third embodiment has a single flap structure. Although a frame unit (or frame, which is the same as that in the first embodiment) is not illustrated in the active air flap 3000 in order to intuitively express the features of the configuration, the frame unit may be included in the active air flap 3000 of the third embodiment.

In summary, the active air flap 3000 of the third embodiment includes a loader shaft 3430 and a fixing unit 3500 (see FIG. 24) used to prevent each flap member 3210 from being twisted due to an external force (aerodynamics, high-pressure water for washing, or the like).

For example, the active air flap 3000 of the present embodiment is configured such that an actuator 3310 is connected to only one side of the active air flap 3000 and the loader shaft 3430 functions as a drive shaft of the actuator 3310. In this case, the loader shaft 3430 is as long as the flap member 3210 to reinforce the rigidity of the flap member 3210.

In particular, since a link bar 3420 positioned at each end of the flap member 3210 is connected to each longitudinal end of the loader shaft 3430, the actuator 3310 may rotate the flap member 3210 without a problem even if the actuator 3310 is actuated only on one side of the active air flap 3000.

Besides, by adopting a snap-fit fastening structure between the fixed unit 3500 (see FIG. 24), fixed around each end of the loader shaft 3430, and the flap member 3210, it is possible to prevent the flap member 3210 from shaking.

Specifically, the active air flap 3000 includes the frame unit (not shown), a flap unit 3200, a drive unit 3300, and a link unit 3400.

The frame unit of the third embodiment has a hollow structure in which the frame unit has a separate accommodation space therein like the frame unit of the above-mentioned first embodiment, and communicates with the outside air inlet of the grill 2.

The frame unit includes a first guide groove 3121 having a straight section 3121*a* and a curved section 3121*b* and a second guide groove 3122 having a straight path, the first and second guide grooves 3121 and 3122 being in a stepped portion.

The flap unit 3200 may be connected to the frame unit (not shown) communicating with the outside air inlet of the radiator grill 2 or may be connected directly to the grill, for rotation.

The flap unit 3200 includes the flap member 3210, a first guide protrusion 3211, a second guide protrusion 3212, and a fixing protrusion 3213.

The flap member 3210 and the first and second guide protrusions 3211 and 3212 are the same as those of the above-mentioned embodiments. However, the present embodiment is different from the above-mentioned embodiments in that the fixing protrusion 3213 protrudes from each front end of the flap member 3210. A detailed description thereof will be given later.

The drive unit 3300 provides a driving force to the flap unit 3200. In this case, the drive unit 3300 is actuated by an electronic control unit (ECU) 10 to cause the flap member 3210 to sequentially open and close the outside air inlet.

The link unit 3400 is connected between the flap unit 3200 and the drive unit 3300 to transmit a driving force from the actuator 3310 of the drive unit 3300 to the flap unit 3200.

The link unit 3400 includes the link bar 3420, the loader shaft 3430, a link panel 3440, and a stopper 3450.

The link bar 3420 serves to restrain each end of the flap member 3210 and is in the form of a long bar.

The loader shaft 3430 connects a plurality of link bars 3420 positioned at both ends of the flap member 3210. The loader shaft 3430 is connected to one end of each of the link bars 3420.

The loader shaft 3430 mainly functions to transmit the power of the actuator 3310 to both ends of the flap member 3210 while preventing the power from being biased to either side. Thereby, the loader shaft 3430 prevents the flap member 3210 from being twisted by providing uniform power to both ends of the flap member 3210.

One end of the loader shaft 3430 may be connected directly to the actuator 3310 to function as a shaft rotated in conjunction with the rotational actuation of the actuator 3310.

In another example, a shaft gear 3431 may be provided at one end of the loader shaft 3430. The shaft gear 3431 may be connected between the rotary shaft of the actuator 3310 and the loader shaft 3430 so as to serve as a medium that allows the rotary shaft of the actuator 3310 and the loader shaft 3430 to rotate in conjunction with each other.

The rotary shaft of the actuator 3310 may have an inner circumferential surface corresponding to the outer circumferential surface of the shaft gear 3431, and may have a hollow structure into which the shaft gear 3431 is inserted. In this case, the rotary shaft of the actuator 3310 may be detachable from the actuator 3310.

Each link panel 3440 connects the other end of the associated link bar 3420 to the first guide protrusion 3211 protruding from the associated end of the flap member 3210. The link panel 3440 may be rotatably connected to the other end of the link bar 3420.

The stopper 3450 is fixed to each end of the loader shaft 3430 to rotate together with the loader shaft 3430. The stopper 3450 mainly serves to prevent the second guide protrusion 3212 from being pushed, the second guide protrusion 3212 functioning as an axis of rotation of the flap member 3210. For example, when the flap member 3210 is rotated on the straight section 3121a by the second guide protrusion 3212, the stopper 3450 is kept abutting on the second guide protrusion 3212 so as to prevent the second guide protrusion 3212 from being pushed in the forward-rearward direction.

FIGS. 24 to 27 illustrate a state in which the active air flap is sequentially opened according to the third embodiment of the present disclosure.

Referring to FIGS. 24 to 27, the fixing unit 3500 may be disposed on the sliding path of the flap member 3210 to prevent the flap member 3210 from being pushed rearward or twisted due to aerodynamics when the fixing protrusion 3213 protruding from each end of the flap member 3210 is seated thereon.

The fixing unit 3500 may have therein a fixing groove 3510 corresponding to the fixing protrusion 3213, and may be made of an elastic material capable of shock mitigation.

The fixing groove 3510 may be recessed only in a partial section into which the fixing protrusion 3213 is inserted.

The fixing groove 3510 includes a support part 3511 and a seating part 3512.

The support part 3511 serves to support the lower portion of the fixing protrusion 3213.

The seating part 3512 serves to seat the outer circumferential surface of the fixing protrusion 3213. The contact surface of the seating part 3512, which abuts on the fixing protrusion 3213, may have a shape corresponding to the outer circumferential surface of the fixing protrusion 3213.

Hereinafter, the mechanism for opening the active air flap 3000 according to the third embodiment of the present disclosure is as follows.

Firstly, the actuator 3310 of the drive unit 3300 is actuated in response to the command from the ECU 10, and the shaft gear 3431 connected to one end of the loader shaft 3430 is connected to the shaft of the actuator 3310 to rotate clockwise (in the negative direction of the Y-axis).

Secondly, the link bar 3420 connected coaxially to the shaft gear 3431 rotates clockwise in conjunction with the shaft gear 3431. The link panel 3440 connected to the link bar 3420 is pushed rearward (in the negative direction of the Y-axis).

Thirdly, the first guide protrusion 3211 connected to the link panel 3440 passes through the straight section 3121a (see FIG. 21) and the curved section 3121b (see FIG. 21) of the first guide groove 3121 in sequence. Thus, the flap member 3210 rotates clockwise (in the negative direction of the Y-axis) and gradually opens the outside air inlet.

In this process, the second guide protrusion 3212 moves linearly to the rear end (in the negative direction of the Y-axis) of the second guide groove 3122 when the first guide protrusion 3211 moves in the negative direction of the Y-axis through the straight section 3121a of the first guide groove 3121. In this case, the stopper 3450 serves to fix the second guide protrusion 3212 such that the second guide protrusion 3212 is not pushed by an external force to the end point of linear movement by rotating a fan-shaped prevention structure of the stopper 3450.

Then, the second guide protrusion 3212 serves as an axis of rotation of the flap member 3210 that rotates rearward (in the negative direction of the Y-axis) in place (at the rear end of the second guide groove 3122), when the first guide protrusion 3211 moves through the curved section 3121b of the first guide groove 3121. The link panel 3440 has a hook 3441 rotated, with the second guide protrusion 3212 seated thereon, together with the flap member 3210, thereby auxiliary performing power transmission.

Consequently, the active air flap 3000 can effectively control an opening area of the flap member 3210.

Figure 28:
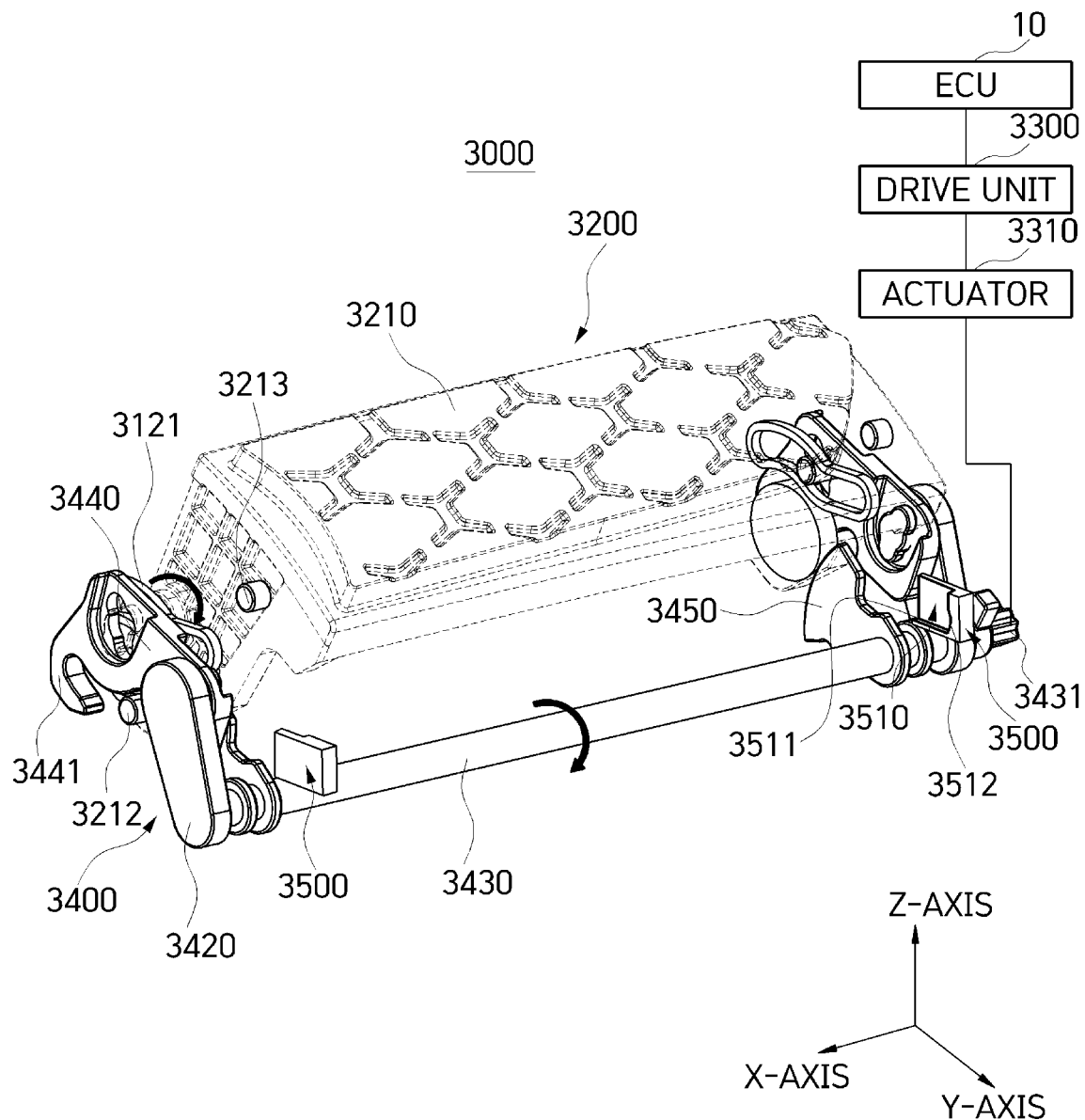
FIGS. 28 to 30 are exemplary views schematically illustrating a state in which the active air flap is sequentially closed according to the third embodiment of the present disclosure.
Figure 29:
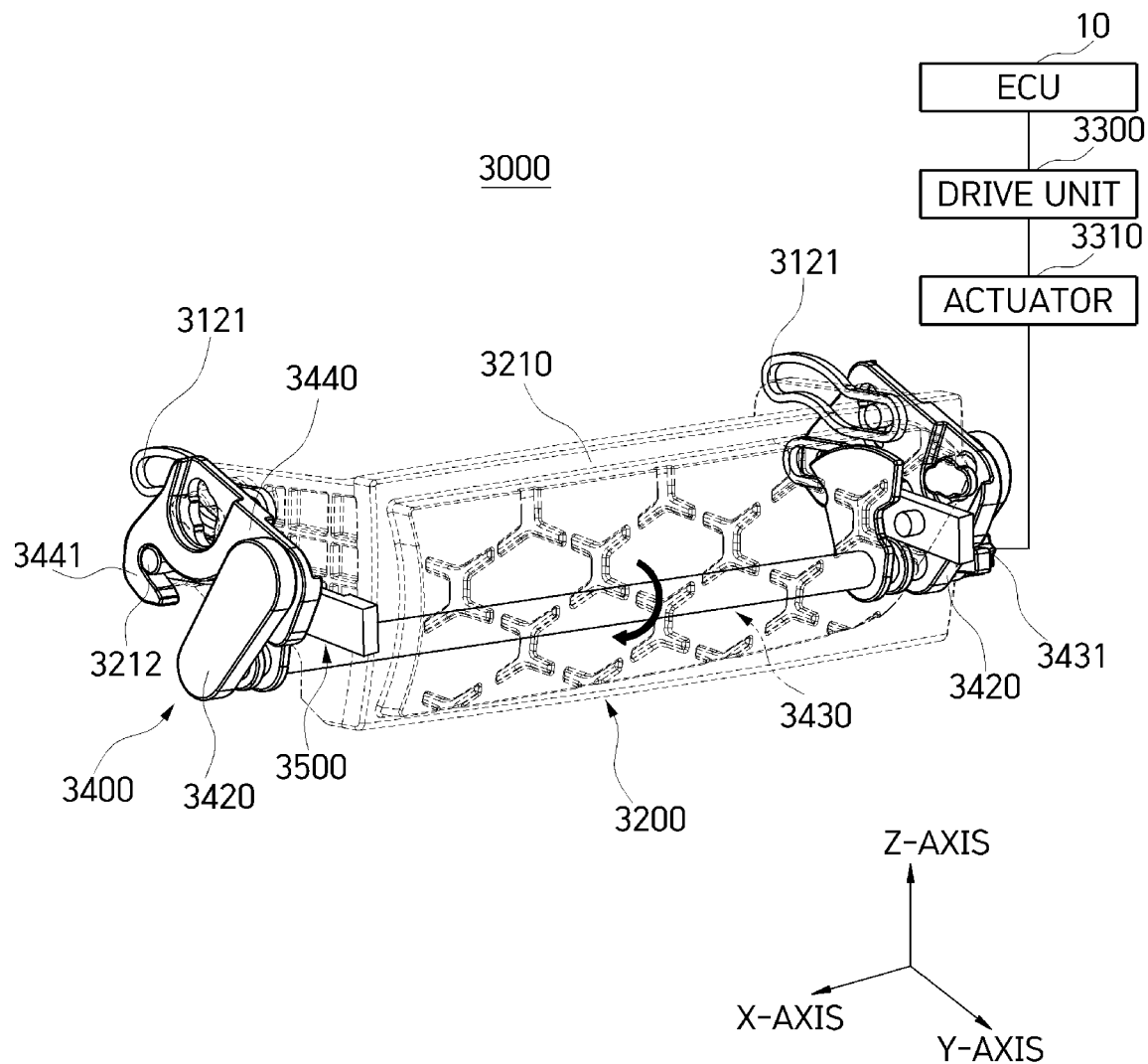
Figure 30:
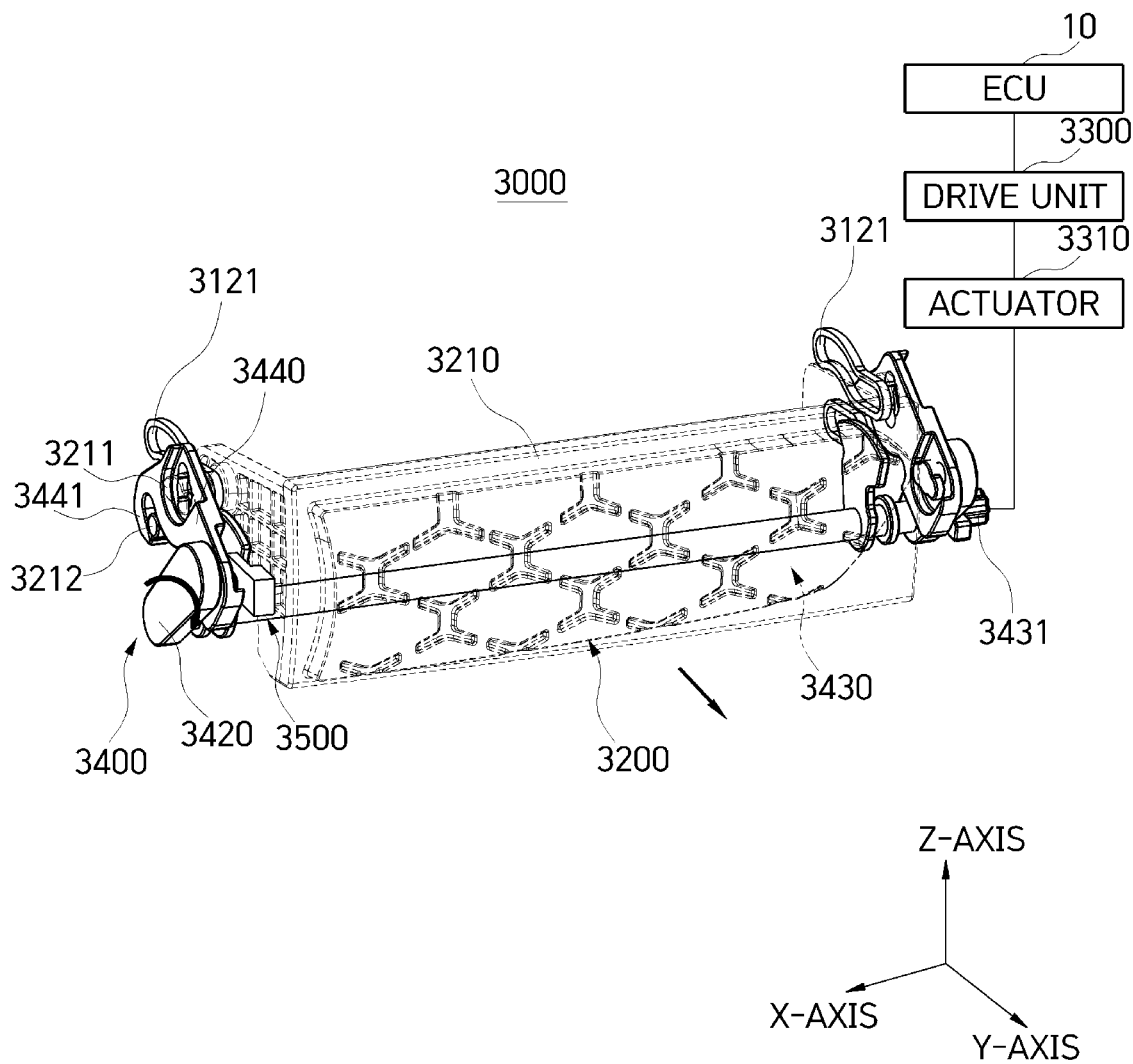

FIGS. 28 to 30 illustrate a state in which the active air flap is sequentially closed according to the third embodiment of the present disclosure.

Referring to FIGS. 28 to 30, the mechanism for closing the active air flap 3000 according to the third embodiment of the present disclosure is as follows.

Firstly, the actuator 3310 of the drive unit 3300 is actuated in response to the command from the ECU 10, and the shaft gear 3431 connected between one end of the loader shaft 3430 and the shaft of the actuator 3310 rotates counterclockwise (in the positive direction of the Y-axis) in conjunction with the shaft of the actuator 3310.

Secondly, the link bar 3420 connected coaxially to the shaft gear 3431 rotates counterclockwise in conjunction with the shaft gear 3431. The link panel 3440 connected to the link bar 3420 is pulled forward (in the positive direction of the Y-axis).

Thirdly, the first guide protrusion 3211 connected to the link panel 3440 passes through the curved section 3121b and the straight section 3121a of the first guide groove 3121 in sequence. Thus, the flap member 3210 rotates counterclockwise (in the positive direction of the Y-axis) and gradually closes the outside air inlet.

In this process, the second guide protrusion 3212 serves as an axis of rotation of the flap member 3210 and rotates in place until the first guide protrusion 3211 enters the straight section 3121a from the curved section 3121b of the first guide groove 3121. In this case, the stopper 3450 serves to fix the second guide protrusion 3212 such that the second guide protrusion 3212 is not pushed by an external force to the starting point of linear movement by rotating the fan-shaped prevention structure of the stopper 3450.

Then, the second guide protrusion 3212 moves linearly to the front end (in the positive direction of the Y-axis) of the second guide groove 3122 when the first guide protrusion 3211 moves forward (in the positive direction of the Y-axis) through the straight section 3121a of the first guide groove 3121. Accordingly, the flap member 3210 returns to its initial position and maintains the outside air inlet of the grill to be closed.

As is apparent from the above description, the active air flap for vehicles can increase cooling efficiency and optimize aerodynamic performance by controlling the flap members sequentially operated based on the structure of multi-path (2-way path) operation.

In particular, the present disclosure provides a structural mechanism that can prevent one or multiple flap members from being pushed due to aerodynamics and simultaneously twisted in either direction when the flap members are operated.

Accordingly, it is possible to significantly reduce the operating torque of the actuator, and further to smoothly operate the active air flap even while the vehicle is traveling at high speed.

Moreover, the present disclosure has an advantage in that the active air flap can be utilized as a variety of exterior design factors of the vehicle since it is possible to sequentially open and close the air inlet.

The present disclosure is not limited to the above-mentioned embodiments, and it will be apparent to those skilled in the art that various variations and modifications may be made without departing from the spirit and scope of the disclosure as defined in the following claims.

What is claimed is:

1. An active air flap for a vehicle, comprising:
   a flap part configured to open and close an outside air inlet of a grill located at a front of a vehicle through a plurality of paths;
   a drive unit configured to provide a driving force to the flap part; and
   a link unit configured to transmit the driving force of the drive unit to the flap part,
   wherein the link unit includes:
   a loader shaft configured to rotate in conjunction with an actuator shaft of the drive unit;
   a link bar having a first end connected to both ends of the loader shaft in a longitudinal direction, and a second end located at both ends of the flap part; and
   a link panel configured to connect the other end of the link bar and both ends of the flap part, wherein the flap part includes:
   a flap unit configured to communicate with the outside air inlet of the grill located at the front of the vehicle, and connected to a frame including a first guide groove having a straight section and a curved section that are configured as a single path, and a second guide groove having a straight path in a state of being spaced apart from the first guide groove to open and close the outside air inlet.

2. The active air flap of claim 1, wherein the first end of the link bar and the link panel are connected to be rotatable with respect to each other.

3. The active air flap of claim 1, wherein the second end of the link bar is fixed and connected to the loader shaft to rotate in conjunction with the loader shaft.

4. The active air flap of claim 1, wherein the flap part is connected to enable a linear movement and a rotation movement on a frame that communicates with the outside air inlet of the grill located at the front of the vehicle to open and close the outside air inlet.

5. The active air flap of claim 1, wherein the flap part includes:
   a first guide protrusion protruding in a partial section of both ends of the flap unit and movable on the first guide groove; and
   a second guide protrusion having a stepped portion spaced apart from the first guide protrusion, and movable on the second guide groove.

6. The active air flap of claim 1, wherein the flap unit is configured to:
   linearly move to the straight section of the first guide groove and the straight path of the second guide groove and then rotates through the curved section of the first guide groove when the outside air inlet is opened, and
   rotate by the curved section of the first guide groove and then return to an initial position through the straight section of the first guide groove and the straight path of the second guide groove when the outside air inlet is closed.

7. The active air flap of claim 1, wherein the second guide protrusion is located at a rear end of the second guide groove and is configured to function as a rotation shaft of the flap unit when the flap unit opens and closes the outside air inlet.

8. The active air flap of claim 1, wherein the drive unit and the link unit are built in a frame that communicates with the outside air inlet of the grill, and
   the frame includes a portion partially protruding therefrom and covered by a cover.

* * * * *